(12) United States Patent
Chiba et al.

(10) Patent No.: US 8,846,285 B2
(45) Date of Patent: Sep. 30, 2014

(54) TONER FOR DEVELOPING ELECTROSTATIC IMAGES

(75) Inventors: Takeru Chiba, Tokyo (JP); Hisashi Kurokawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 123 days.

(21) Appl. No.: 13/806,473

(22) PCT Filed: Jun. 24, 2011

(86) PCT No.: PCT/JP2011/064554
§ 371 (c)(1),
(2), (4) Date: Dec. 21, 2012

(87) PCT Pub. No.: WO2012/002278
PCT Pub. Date: Jan. 5, 2012

(65) Prior Publication Data
US 2013/0101934 A1    Apr. 25, 2013

(30) Foreign Application Priority Data

Jun. 29, 2010 (JP) ................................ 2010-147762
Sep. 29, 2010 (JP) ................................ 2010-218786

(51) Int. Cl.
| | |
|---|---|
| *G03G 9/08* | (2006.01) |
| *G03G 9/093* | (2006.01) |
| *G03G 9/097* | (2006.01) |
| *B82Y 30/00* | (2011.01) |

(52) U.S. Cl.
CPC ........ *G03G 9/09342* (2013.01); *G03G 9/09392* (2013.01); *G03G 9/09321* (2013.01); *G03G 9/09328* (2013.01); *G03G 9/0819* (2013.01); *G03G 9/0827* (2013.01); *G03G 9/09708* (2013.01); *G03G 9/09716* (2013.01); *G03G 9/09725* (2013.01); *B82Y 30/00* (2013.01); *Y10S 977/773* (2013.01)
USPC ...................... 430/110.2; 430/110.3; 977/773

(58) Field of Classification Search
CPC .......... G03G 9/09392; G03G 9/09328; G03G 9/09321; G03G 9/09708; G03G 9/0725; G03G 9/09342; G03G 9/09716; G03G 9/0827; G03G 9/0819; G03G 9/08219; Y10S 977/773; B82Y 30/00
USPC ............................................. 430/110.2, 110.3
See application file for complete search history.

(56) References Cited

U.S. PATENT DOCUMENTS

2011/0223534 A1    9/2011  Shibata et al.

FOREIGN PATENT DOCUMENTS

| | | |
|---|---|---|
| JP | 2002-062681 A | 2/2002 |
| JP | 2002-131976 A | 5/2002 |
| JP | 2005-82765 A | 3/2005 |
| JP | 2005-97575 A | 4/2005 |
| JP | 2005-140952 A | 6/2005 |
| JP | 2005-148378 A | 6/2005 |
| JP | 2005-173480 A | 6/2005 |
| JP | 2005-202131 A | 7/2005 |
| JP | 2005-202133 A | 7/2005 |
| JP | 2011-206762 A | 10/2011 |

OTHER PUBLICATIONS

Machine English language translation of JP 2011-206762 Oct. 2011.*
International Search Report for PCT/JP2011/064554, mailing date of Sep. 13, 2011.

* cited by examiner

*Primary Examiner* — Hoa V Le
(74) *Attorney, Agent, or Firm* — Westerman, Hattori, Daniels & Adrian, LLP

(57) ABSTRACT

An object of the present invention is to provide a toner for developing electrostatic images, which prevents a decrease in toner charge amount in the environment of high temperature and high humidity, prevents occurrence of fog and has excellent flowability.
Provided is a toner for developing electrostatic images, comprising an external additive and colored resin particles comprising a binder resin and a colorant, wherein the external additive is core-shell type complex fine particles in which resin fine particles are covered with at least one inorganic component selected from the group consisting of silica, alumina, titania and zirconia, and the volume ratio of the inorganic component of the core-shell type complex fine particles is 45 to 75% by volume when the total volume of the core-shell type complex fine particles is 100% by volume.

7 Claims, No Drawings

TONER FOR DEVELOPING ELECTROSTATIC IMAGES

TECHNICAL FIELD

The present invention relates to a toner for developing electrostatic images (hereinafter it may be simply referred to as "toner"), which is used to develop electrostatic latent images in electrophotography, electrostatic recording, electrostatic printing, etc.

BACKGROUND ART

A technique of forming a desired image by developing an electrostatic latent image formed on a photoconductor with a toner for developing electrostatic images, is widely used in image forming devices such as an electrophotography device, an electrostatic recording device and an electrostatic printing device. Such a technique is also applied to copying machines, printers, facsimiles and multi-functional printers thereof.

For example, generally, in an electrophotography device using an electrophotography method, an electrostatic latent image is formed on a photoconductor, which is made of a photoconductive material, by uniformly charging the surface of the photoconductor by various methods. Then, the electrostatic latent image is developed with a toner, transferred to a recording medium such as a paper, and then fixed by heating, etc., thereby obtaining a copy.

Toners used for development are divided into negatively-charged toners and positively-charged toners. Electrophotography devices which use positively-charged toners are preferably used in recent years because such devices produce less ozone and provide an excellent charge property.

In order to increase charge stability, flowability, durability, etc., of a toner, an external additive such as inorganic or organic fine particles generally having a smaller particle diameter than that of colored resin particles (toner particles) is added (attached) to the surface of toner particles used for development.

In conventional toners, the external additive is transferred to the inside of the toner particles from the surface of the toner particles and/or is released (detached) from the surface of the toner particles by a mechanical stress caused inside a developing device (an increase in the number of contacts between the toner particles by stirring or the like), etc., in the process of continuous printing of a large number of sheets. Therefore, there is a decrease in the function of the external additive and it becomes difficult to provide the toner particles with a stable charge property over time (charge stability).

The toner particles in which the external additive is embedded cause a phenomenon that the toner particles are attached to the surface of the photoconductor (filming phenomenon); therefore, a deterioration in image quality by fog or the like, is likely to occur. The external additive released (detached) from the surface of the toner particles deteriorates the charge property of the surface of the photoconductor, thereby causing a deterioration in printing durability of the toner and/or a deterioration in image quality. Especially under a condition of high temperature and high humidity, image quality is significantly deteriorated by filming.

Therefore, there is a demand for a toner which causes no failures such as the above-described embedding and/or releasing of the external additive, which can keep the external additive suitably attached over time, and which can maintain a stable charge property (charge stability) even in the case where, as in the case of continuous printing of a large number of sheets, there is an increase in the number of contacts between the toner particles inside the developing device by stirring or the like.

A toner is disclosed in Patent Literature 1, which uses inorganic/organic complex fine particles comprising organic fine particles and inorganic fine particles attached to the surface of the organic fine particles. Patent Literature 2 discloses a toner comprising, as the external additive, resin fine particles which have a specific average particle diameter and of which surface is covered with a continuous layer of silica.

CITATION LIST

Patent Literatures

Patent Literature 1: Japanese Patent Application Laid-Open (JP-A) No. 2002-131976
Patent Literature 2: JP-A No. 2005-173480

SUMMARY OF INVENTION

Technical Problem

In paragraph [0064] of the Specification of Patent Literature 1, methods for fixing inorganic fine particles onto the surface of organic fine particles are explained, such as a method of mixing organic fine particles with inorganic fine particles and then heating the mixture, and a method of mechanically fixing inorganic fine particles onto the surface of organic fine particles, that is, a so-called mechanochemical method. By such production methods, however, it is difficult to cover the whole surface of organic fine particles to be cores, with inorganic fine particles. It was also found by the inventors of the present invention that the toner of Patent Literature 1 likely to cause fog, especially fog in the environment of high temperature and high humidity.

In claim 6 of Patent Literature 2, it is explained that the existence ratio of silicon atoms on the surface of an external additive is 0.1 to 10.0% by mass. In such an external additive, however, the thickness of a silica shell is too thin, so that there is a small contribution of the effects of a silica shell to the entire external additive. Therefore, a charge property is unlikely to be exhibited in the environment of low temperature and low humidity.

The first object of the present invention is to provide a toner for developing electrostatic images, which can prevent a decrease in toner charge amount and an occurrence of fog in the environment of high temperature and high humidity, and which has excellent flowability.

The second object of the present invention is to provide a toner for developing electrostatic images, which can prevent fog in the environment of high temperature and high humidity, and which has excellent thin line reproducibility in the environment of low temperature and low humidity.

Solution to Problem

As the result of diligent researches made to attain the above objects, the inventors of the present invention found that the environmental stability of a toner is increased by using as an external additive core-shell type complex fine particles in which resin fine particles are covered with silica, alumina, titania and/or zirconia. The inventors found that especially by using core-shell type complex fine particles comprising resin fine particles of which surface is covered with silica, it is possible to prevent a decrease in toner charge amount in the environment of high temperature and high humidity, prevent fog and perform stable printing in the same environment, and to exhibit very high toner flowability and obtain excellent image quality, therefore. The inventors also found that especially by using core-shell type complex fine particles in which resin fine particles are covered with alumina, titania and/or zirconia, it is possible to prevent an increase in toner charge amount in the environment of low temperature and low humidity, to perform stable printing in the same environment without a deterioration in thin line reproducibility, and to prevent printing failure caused by an increase in charge amount and obtain excellent image quality, therefore. The inventors of the present invention completed the present invention based on the above knowledge.

In particular, the toner for developing electrostatic images according to the present invention comprises an external additive and colored resin particles comprising a binder resin and a colorant, wherein the external additive is core-shell type complex fine particles in which resin fine particles are covered with at least one inorganic component selected from the group consisting of silica, alumina, titania and zirconia, and the volume ratio of the inorganic component of the core-shell type complex fine particles is 45 to 75% by volume when the total volume of the core-shell type complex fine particles is 100% by volume.

In the present invention, the core-shell type complex fine particles preferably have a moisture absorption amount of 0.5 to 2.5% by mass.

In the present invention, the added amount of the core-shell type complex fine particles is preferably 0.1 to 2.0 parts by mass with respect to 100 parts by mass of the colored resin particles.

In the present invention, the colored resin particles preferably have a volume average particle diameter of 4 to 12 μm and an average circularity of 0.96 to 1.00.

In the present invention, it is preferable that the colored resin particles and the core-shell type complex fine particles are positively charged.

In the present invention, the core-shell type complex fine particles preferably have a number average particle diameter of 30 to 300 nm.

In the present invention, the resin fine particles of the core-shell type complex fine particles are preferably fine particles comprising a cross-linked resin.

Advantageous Effects of Invention

According to the present invention as described above, by using as an external additive core-shell type complex fine particles in which resin fine particles are covered with silica, it is possible to provide a toner for developing electrostatic images, which provides the toner particles with a stable charge property over time, which is unlikely to cause a deterioration in image quality by fog or the like, and which has excellent flowability even in the case of continuous printing of a large number of sheets.

Also according to the present invention as described above, by using as an external additive core-shell type complex fine particles in which resin fine particles are covered with alumina, titania and/or zirconia, it is possible to provide a toner for developing electrostatic images, which prevents an increase in toner charge amount in the environment of low temperature and low humidity, which performs stable printing in the same environment without a deterioration in thin line reproducibility, and which prevents printing failure caused by an increase in charge amount and provides excellent image quality, therefore.

DESCRIPTION OF EMBODIMENTS

The toner for developing electrostatic images according to the present invention comprises an external additive and colored resin particles comprising a binder resin and a colorant, wherein the external additive is core-shell type complex fine particles in which resin fine particles are covered with at least one inorganic component selected from the group consisting of silica, alumina, titania and zirconia, and the volume ratio of the inorganic component of the core-shell type complex fine particles is 45 to 75% by volume when the total volume of the core-shell type complex fine particles is 100% by volume.

Hereinafter, the toner for developing electrostatic images (hereinafter it may be simply referred to as "toner") according to the present invention, will be explained.

The toner of the present invention comprises colored resin particles comprising a binder resin and a colorant, and as an external additive core-shell type complex fine particles in which resin fine particles are covered with silica, alumina, titania and/or zirconia.

The toner of the present invention is preferably one obtained by adding and attaching the core-shell type complex fine particles as an external additive to the surface of the colored resin particles.

Hereinafter, the method for producing colored resin particles used in the present invention, the colored resin particles obtained by the production method, the method for producing core-shell type complex fine particles used in the present invention as an external additive, the core-shell type complex fine particles obtained by the production method, the method for producing the toner of the present invention using the colored resin particles and the external additive, and the toner of the present invention, will be explained in order.

1. Method for Producing Colored Resin Particles

In general, methods for producing colored resin particles are broadly divided into dry methods such as a pulverization method and wet methods such as an emulsion polymerization agglomeration method, a suspension polymerization method and a solution suspension method. Preferred are wet methods since it is easy to obtain a toner with excellent printing properties such as image reproducibility. Among wet methods, since it is easy to obtain a toner with a relatively small particle size distribution on the micrometer scale, polymerization methods such as an emulsion polymerization agglomeration method and a suspension polymerization method are preferred. Among polymerization methods, a suspension polymerization method is more preferred.

The emulsion polymerization agglomeration method produces colored resin particles as follows: an emulsified polymerizable monomer is polymerized to obtain an emulsion of resin fine particles, and the emulsion is agglutinated with a colorant dispersion or the like to produce colored resin particles. The solution suspension method is a method of producing colored resin particles by (1) forming droplets of a solution in an aqueous medium, the solution being prepared by dissolving or dispersing toner components such as a binder resin and a colorant in an organic solvent, and (2) removing the organic solvent therefrom to obtain colored resin particles. As these methods, heretofore known methods can be employed.

The colored resin particles of the present invention can be produced by wet methods or dry methods. The production is performed by a suspension polymerization method, which is a preferred wet method, by the following process.

(A) Suspension Polymerization Method (A-1) Polymerizable Monomer Composition Preparation Process First, a polymerizable monomer, a colorant, and other additives which are added as needed, such as a charge control agent and a release agent, are mixed to prepare a polymerizable monomer composition. The mixing for forming the polymerizable monomer composition is performed by a media type dispersing device, for example.

In the present invention, the polymerizable monomer is a monomer having a polymerizable functional group, and the polymerizable monomer is polymerized to be a binder resin. It is preferable to use a monovinyl monomer as a major component of the polymerizable monomer. Examples of the monovinyl monomer include styrene; styrene derivatives such as vinyl toluene and α-methylstyrene; acrylic acid and methacrylic acid; acrylic esters such as methyl acrylate, ethyl acrylate, propyl acrylate, butyl acrylate, 2-ethylhexyl acrylate and dimethylaminoethyl acrylate; methacrylic esters such as methyl methacrylate, ethyl methacrylate, propyl methacrylate, butyl methacrylate, 2-ethylhexyl methacrylate and dimethylaminoethyl methacrylate; nitrile compounds such as acrylonitrile and methacrylonitrile; amide compounds such as acrylamide and methacrylamide; olefins such as ethylene, propylene and butylene. These monovinyl monomers can be used alone or in combination of two or more kinds. Among them, styrene, styrene derivatives, acrylic acid derivatives and methacrylic acid derivatives are suitably used as the monovinyl monomer.

In order to improve hot offset and shelf stability, it is preferable to use any cross-linkable polymerizable monomer along with the monovinyl monomer. The cross-linkable polymerizable monomer is a monomer having two or more polymerizable functional groups. Examples of the cross-linkable polymerizable monomer include aromatic divinyl compounds such as divinylbenzene, divinylnaphthalene and derivatives thereof; ester compounds such as ethylene glycol dimethacrylate and diethylene glycol dimethacrylate, in which two or more carboxylic acids are esterified to alcohol having two or more hydroxyl groups; other divinyl compounds such as N,N-divinylaniline and divinyl ether; and compounds having three or more vinyl groups. These cross-linkable polymerizable monomers can be used alone or in combination of two or more kinds.

In the present invention, it is desirable to use the cross-linkable polymerizable monomer generally in an amount of 0.1 to 5 parts by mass, preferably in an amount of 0.3 to 2 parts by mass, with respect to 100 parts by mass of the monovinyl monomer.

It is also preferable to use a macromonomer as a part of the polymerizable monomer because the toner thus obtained has an excellent balance between shelf stability and low-temperature fixability. A macromonomer is an oligomer or polymer which has a polymerizable carbon-carbon unsaturated double bond at the end of a polymer chain thereof and which generally has a number average molecular weight of 1,000 to 30,000. The macromonomer is preferably one that provides a polymer having a higher glass transition temperature (hereinafter may be referred to as "Tg") than that of a polymer obtained by polymerization of a monovinyl monomer. The macromonomer is used in an amount of preferably 0.03 to 5 parts by mass, more preferably 0.05 to 1 part by mass, with respect to 100 parts by mass of the monovinyl monomer.

A colorant is used in the present invention. In the case of producing a color toner, a black colorant, a cyan colorant, a yellow colorant and a magenta colorant can be used.

As the black colorant, for example, carbon black, titanium black and magnetic powders such as zinc-ferric oxide and nickel-ferric oxide, can be used.

As the cyan colorant, for example, copper phthalocyanine compounds and derivatives thereof, and anthraquinone compounds can be used. In particular, there may be mentioned C.I. Pigment Blue 2, 3, 6, 15, 15:1, 15:2, 15:3, 15:4, 16, 17:1 and 60, for example.

As the yellow colorant, for example, azo-based pigments such as monoazo pigments and disazo pigments, and compounds such as condensation polycyclic pigments can be used. For example, there may be mentioned C.I. Pigment Yellow 3, 12, 13, 14, 15, 17, 62, 65, 73, 74, 83, 93, 97, 120, 138, 155, 180, 181, 185 and 186.

As the magenta colorant, compounds such as azo-based pigments such as monoazo pigments and disazo pigments, and condensation polycyclic pigments can be used. For example, there may be mentioned C.I. Pigment Violet 19 and C.I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 237, 251 and 269.

In the present invention, the colorants can be used alone or in combination of two or more kinds. The amount of the colorant is preferably 1 to 10 parts by mass with respect to 100 parts by mass of the monovinyl monomer.

As one of the other additives, there may be used a charge control agent having positively- or negatively-charging ability, in order to increase the charge property of the toner.

The charge control agent is not particularly limited as long as it is one that is generally used as a charge control agent for toners. Among charge control agents, a charge control resin having positively- or negatively-charging ability is preferred, because it has high compatibility with the polymerizable monomer and can provide toner particles with a stable charge property (charge stability). From the viewpoint of obtaining a positively-charged toner, a charge control resin having positively-charging ability is more preferably used.

Examples of the charge control agent having positively-charging ability include nigrosine dyes, quaternary ammonium salts, triaminotriphenylmethane compounds and imidazole compounds. Charge control resins preferably used as the charge control agent having positively-charging ability, include polyamine resins, quaternary ammonium group-containing copolymers and quaternary ammonium salt group-containing copolymers, for example.

Examples of the charge control agent having negatively-charging ability include azo dyes containing a metal such as Cr, Co, Al or Fe, salicylate metal compounds and alkyl salicylate metal compounds. Charge control resins preferably used as the charge control agent having negatively-charging ability, include sulfonic acid group-containing copolymers, sulfonic acid salt group-containing copolymers, carboxylic acid group-containing copolymers and carboxylic acid salt group-containing copolymers, for example.

In the present invention, it is desirable to use the charge control agent generally in an amount of 0.01 to 10 parts by mass, preferably in an amount of 0.03 to parts by mass, with respect to 100 parts by mass of the monovinyl monomer. When the added amount of the charge control agent is less than 0.01 part by mass, fog can occur. On the other hand, when the added amount of the charge control agent is more than 10 parts by mass, printing soiling can occur.

As one of the other additives, it is also preferable to use a molecular weight modifier when polymerizing the polymerizable monomer that will be turned into a binder by polymerization.

The molecular weight modifier is not particularly limited as long as it is one that is generally used as a molecular weight modifier for toners. Examples of the molecular weight modifier include mercaptans such as t-dodecyl mercaptan, n-dodecyl mercaptan, n-octyl mercaptan and 2,2,4,6,6-pentamethylheptane-4-thiol, and thiuram disulfides such as tetramethylthiuram disulfide, tetraethylthiuram disulfide, tetrabutylthiuram disulfide, N,N'-dimethyl-N,N'-diphenylthiuram disulfide and N,N'-dioctadecyl-N,N'-diisopropylthiuram disulfide. These molecular weight modifiers can be used alone or in combination of two or more kinds.

In the present invention, it is desirable to use the molecular weight modifier generally in an amount of 0.01 to 10 parts by mass, preferably in an amount of 0.1 to 5 parts by mass, with respect to 100 parts by weight of the monovinyl monomer.

Moreover, it is preferable to add a release agent further as one of the other additives. The releasing characteristic of the toner from a fixing roller upon fixing, can be improved by adding a release agent. The release agent can be used without any particular limitation as long as it is one that is generally used as a release agent for toners. Examples of the release agent include low-molecular-weight polyolefin waxes and modified waxes thereof; natural plant waxes such as jojoba wax; petroleum waxes such as paraffin wax; mineral waxes such as ozokerite wax; synthetic waxes such as Fischer-Tropsch wax; and ester waxes such as polyglycerol ester and dipentaerythritol ester. Preferred are ester waxes because the toner thus obtained has an excellent balance between shelf stability and low-temperature fixability. More preferred are polyvalent alcohol esters. They can be used alone or in combination of two or more kinds.

The release agent is preferably used in an amount of 0.1 to 30 parts by mass, more preferably in amount of 1 to 20 parts by mass, with respect to 100 parts by mass of the monovinyl monomer.

(A-2) Suspension Process for Obtaining a Suspension (Droplet Forming Process)

In the present invention, the polymerizable monomer composition containing the polymerizable monomer and the colorant is dispersed in an aqueous medium. After adding a polymerization initiator thereto, formation of droplets of the polymerizable monomer composition is carried out. The method for forming droplets is not particularly limited. For example, the formation is carried out with a device which can perform strong stirring, such as an (in-line type) emulsifying and dispersing device (product name: MILDER; manufactured by Ebara Corporation) or a high-speed emulsifying and dispersing device (product name: T.K. HOMO MIXER MARK II; manufactured by: PRIMIX Corporation)

Examples of the polymerization initiator include persulfates such as potassium persulfate and ammonium persulfate; azo compounds such as 4,4'-azobis(4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitril) and 2,2'-azobisisobutyronitrile; and organic peroxides such as di-t-butyl peroxide, benzoyl peroxide, t-butylperoxy-2-ethylhexanoate, t-hexylperoxy-2-ethylbutanoate, diisopropyl peroxydicarbonate, di-tibutylperoxy isophthalate, and t-butylperoxy isobutyrate. They may be used alone or in combination of two or more kinds. It is preferable to use organic peroxides because it is possible to decrease the amount of the polymerizable monomer remaining in the toner and to obtain excellent printing durability.

Among organic peroxides, peroxyesters are preferred because it is possible to obtain excellent initiator efficiency and to decrease the amount of the remaining polymerizable monomer. More preferred are non-aromatic peroxyesters, that is, peroxyesters having no aromatic ring.

As explained above, the polymerization initiator can be added after the polymerizable monomer composition is dispersed in an aqueous medium and before droplets are formed, or it can be added to the polymerizable monomer composition before the polymerizable monomer composition is dispersed in an aqueous medium.

The added amount of the polymerization initiator used for polymerization of the polymerizable monomer composition, is preferably 0.1 to 20 parts by mass, more preferably 0.3 to 15 parts by mass, and still more preferably 1 to 10 parts by mass, with respect to 100 parts by mass of the monovinyl monomer.

In the present invention, the aqueous medium is a medium which primarily consists of water.

In the present invention, the aqueous medium preferably contains a dispersion stabilizer. As the dispersion stabilizer, there may be mentioned inorganic compounds including: sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and iron(II)hydroxide; and organic compounds including: water-soluble polymers such as polyvinyl alcohol, methyl cellulose and gelatin; anionic surfactants; nonionic surfactants; and ampholytic surfactants. These dispersion stabilizers can be used alone or in combination of two or more kinds.

Among the dispersion stabilizers, preferred are inorganic compounds, especially colloids of hardly water soluble metal hydroxides. By the use of inorganic compounds, especially colloids of hardly water soluble metal hydroxides, the particle size distribution of the colored resin particles can be controlled to be narrower, and the amount of the dispersion stabilizer still remaining after washing, can be decreased. Therefore, the thus-obtained polymerized toner can clearly reproduce images and does not deteriorate environmental stability.

(A-3) Polymerization Process

Droplets are formed as explained under (A-2). The thus-obtained aqueous dispersion medium is heated to initiate polymerization, thereby forming an aqueous dispersion of colored resin particles.

The polymerization temperature of the polymerizable monomer composition is preferably 50° C. or more, more preferably 60 to 95° C. The polymerization reaction time is preferably 1 to 20 hours, more preferably 2 to 15 hours.

The colored resin particles can be mixed with the external additive and used as a polymerized toner. However, it is preferable to produce so-called core-shell type (or capsule type) colored resin particles by using each of the above-obtained colored resin particles as a core layer and forming a shell layer outside the core layer, the shell layer being different from the core layer. By covering the core layer comprising a substance having a low softening point with a substance having a higher softening point, the core-shell type colored resin particles can keep a balance between decreasing fixing temperature and preventing aggregation during storage.

The above-described method for producing core-shell type colored resin particles using the above-obtained colored resin particles, is not particularly limited. Core-shell type colored resin particles can be produced by conventionally-known methods. From the viewpoint of production efficiency, the in-situ polymerization method and the phase separation method are preferred.

Hereinafter, the method for producing core-shell type colored resin particles by the in-situ polymerization method, will be explained.

A polymerizable monomer for forming shell layer (polymerizable monomer for shells) and a polymerization initiator are added to an aqueous medium to initiate polymerization, the aqueous medium having colored resin particles dispersed therein, thereby obtaining core-shell type colored resin particles.

As the polymerizable monomer for shells, those which were listed above in connection with the polymerizable monomer, can be used. Among them, monomers which can provide a polymer having a glass transition temperature (Tg) of more than 80° C. are preferably used alone or in combination of two or more kinds, such as styrene, acrylonitrile and methyl methacrylate.

As the polymerization initiator used for polymerization of the polymerizable monomer for shells, there may be mentioned water-soluble polymerization initiators including: metal persulfates such as potassium persulfate and ammonium persulfate, and azo-based initiators such as 2,2'-azobis(2-methyl-N-(2-hydroxyethyl)propionamide) and 2,2'-azobis(2-methyl-N-(1,1-bis(hydroxymethyl)-2-hydroxyethyl)propionamide). They can be used alone or in combination of two or more kinds. The amount of the polymerization initiator is preferably 0.1 to 30 parts by mass, more preferably 1 to 20 parts by mass, with respect to 100 parts by mass of the polymerizable monomer for shells.

The polymerization temperature of the shell layer is preferably 50° C. or more, more preferably 60 to 95° C. The polymerization reaction time is preferably 1 to 20 hours, more preferably 2 to 15 hours.

(A-4) Washing, Filtration, Dehydration and Drying Process

After the completion of the polymerization, it is preferable to perform the process of filtration, washing to remove the dispersion stabilizer, dehydration and drying on the aqueous dispersion of the colored resin particles obtained by the polymerization, several times as needed and by an ordinary method.

The washing is preferably performed by the following method. When an inorganic compound is used as the dispersion stabilizer, it is preferable to remove the dispersion stabilizer by dissolving the dispersion stabilizer in water by adding an acid or alkali to the aqueous dispersion of the colored resin particles. When a colloid of hardly water soluble inorganic hydroxide is used as the dispersion stabilizer, it is preferable to control the pH of the aqueous dispersion of the colored resin particles to 6.5 or less by adding an acid. As the acid, there may be used inorganic acids such as sulfuric acid, hydrochloric acid and nitric acid, and organic acids such as formic acid and acetic acid. Particularly preferred is sulfuric acid, because of a large removal efficiency and a small burden on production equipment.

The dehydration and filtration can be performed by various known methods, and no particular limitation is imposed thereon. For example, there may be mentioned centrifugal filtration, vacuum filtration and pressure filtration. The drying can be performed by various methods and no particular limitation is imposed thereon.

(B) Pulverization Method

Production of colored resin particles by the pulverization method is performed by the following process.

First, the binder resin, the colorant, and the other additives which are added as needed, such as the charge control agent and the release agent, are mixed with a mixer such as a ball mill, a V-mixer, a HENSCHEL MIXER (product name), a high-speed dissolver, an internal mixer or a Forberg Mixer. Next, the thus-obtained mixture is kneaded with a pressure kneader, a biaxial kneading extruder, a roller or the like, with heating the mixture. The thus-obtained kneaded product is coarsely pulverized with a pulverizer such as a hammer mill, a cutter mill or a roller mill. Moreover, the resultant is finely pulverized with a pulverizer such as a jet mill or a high-speed rotating pulverizer and then is classified into a desired particle diameter with a classifier such as an air classifier or an airflow classifier, thereby obtaining colored resin particles by the pulverization method.

As the binder resin, colorant and other additives which are used as needed, such as the charge control agent and the release agent, there may be used those which were listed above under "(A) Suspension polymerization method." As well as the colored resin particles obtained under "(A) Suspension polymerization method," the colored resin particles obtained by the pulverization method can be used to produce core-shell type colored resin particles by a method such as the in-situ polymerization method.

As the binder resin, there may be also used resins which are conventionally and widely used in toners. Concrete examples of the binder resin used in the polymerization method include polystyrene, styrene-butyl acrylate copolymers, polyester resins and epoxy resins.

2. Colored Resin Particles

The colored resin particles can be obtained by production methods such as the above-described "(A) Suspension polymerization method" and "(B) Pulverization method."

The colored resin particles comprising the toner will be explained below. The colored resin particles to be explained below encompass both core-shell type colored resin particles and other types of colored resin particles.

The colored resin particles preferably have a volume average particle diameter (Dv) of 4 to 12 μm, more preferably 5 to 10 μm. When Dv is less than 4 μm, there is a possibility that the flowability of the toner is decreased and results in poor transferability or decrease in image density. When Dv is more than 12 μm, there is a possibility of a decrease in image resolution.

For the colored resin particles, the ratio of the volume average particle diameter (Dv) and the number average particle diameter (Dn) (that is, Dv/Dn) is preferably 1.0 to 1.3, more preferably 1.0 to 1.2. When Dv/Dn is more than 1.3, there is a possibility of a decrease in transferability, image density and resolution. The volume average particle diameter and number average particle diameter of the colored resin particles can be measured by using a particle diameter analyzer (product name: Multisizer; manufactured by: Beckman Coulter, Inc.), for example.

The colored resin particles of the present invention preferably have an average circularity of 0.96 to 1.00, more preferably 0.97 to 1.00, still more preferably 0.98 to 1.00, from the viewpoint of image reproducibility.

When the average circularity of the colored resin particles is less than 0.96, there is a possibility of poor thin line reproducibility in printing.

In the present invention, "circularity" is defined as a value which is obtained by dividing the circumference of a circle having the same projected area as that of a projected image of a particle by the circumference of the projected image of the particle. Also in the present invention, "average circularity" is used as a simple method for expressing the shape of particles quantitatively, and it is an index of the degree of convexoconcaves of the colored resin particles. "Average circularity" is 1 when the colored resin particles are perfectly spherical. The more complex the surface shape of the colored resin particles, the smaller the value of "average circularity."

It is preferable that the colored resin particles are positively charged.

3. Method for Producing Core-Shell Type Complex Fine Particles

In the core-shell type complex fine particles used as an external additive in the present invention (hereinafter may be simply referred to as "complex fine particles"), it is possible to readily control the particle diameter by using resin fine particles as core particles; moreover, by covering the core particles with an inorganic oxide by the sol-gel method, which is a suitable method that will be explained below, it is possible to produce the core-shell type complex fine particles without firing and thus to control the low true specific gravity. Because of using resin fine particles as the core particles, the core-shell type complex fine particles are relatively soft and can reduce damage to a photoconductor.

As the core-shell type complex fine particles used in the present invention, in which the resin fine particles are covered with at least one inorganic component selected from the group consisting of silica, alumina, titania and zirconia (hereinafter may be referred to as inorganic component), there may be used (i) commercially-available products, (ii) particles obtained by covering commercially-available resin fine particles with the above-described inorganic component, or (iii) resin fine particles produced by polymerization and then covered with the above-described inorganic component. The inorganic component is preferably one component which is selected from the group consisting of silica, alumina, titania and zirconia.

The synthesis method of (ii) is the same as the method of (iii), except that the resin fine particles are synthesized by polymerization reaction. Therefore, the method of (iii) will be explained in detail now.

The resin fine particles can be obtained by pulverizing a resin synthesized with a polymerizable monomer by bulk polymerization. The resin fine particles can be also obtained by synthesizing a polymerizable monomer by solution polymerization and adding the thus-obtained solution to a poor solvent to a polymer obtained by polymerization. Or, the resin fine particles can be obtained by polymerizing a polymerizable monomer by emulsion polymerization. However, as described below, because the number average particle diameter of the core-shell type complex fine particles is preferably in the range of 30 to 300 nm and it is easy to obtain the complex fine particle in this range, it is preferable to obtain the resin fine particles by emulsion polymerization.

As the emulsion polymerization, there may be used conventionally-known emulsion polymerization methods. Auxiliary polymerization raw materials used for normal polymerization can be used for the emulsion polymerization, such as an emulsifier, a polymerization initiator and a molecular weight modifier.

As the resin which is used in the present invention for the resin fine particles to be covered with an inorganic component, there may be mentioned polymers obtained by homo polymerization or copolymerization of the below-listed polymerizable monomers. The polymerizable monomers include, for example, a monovinyl monomer and a cross-linkable polymerizable monomer. Examples of the monovinyl monomer include styrenes such as styrene, o-methylstyrene, m-methylstyrene, p-methylstyrene, p-methoxystyrene, p-phenylstyrene and p-chlorostyrene, and derivatives thereof; ethylenically unsaturated monoolefins such as ethylene, propylene, butylene and isobutylene; vinyl halides such as vinyl chloride, vinylidene chloride, vinyl bromide and vinyl iodide; vinyl esters such as vinyl acetate, vinyl propionate and vinyl benzoate; (meth)acrylic acid esters such as methyl(meth) acrylate, ethyl(meth)acrylate, propyl(meth)acrylate, n-octyl (meth)acrylate, 2-ethylhexyl(meth)acrylate, dimethylaminoethyl(meth)acrylate and diethylaminoethyl(meth)acrylate; vinyl ethers such as vinyl methyl ether, vinyl ethyl ether and vinyl isobutyl ether; and acrylic acid derivatives such as acrylonitrile, methacrylonitrile and acrylamide.

Examples of the cross-linkable polymerizable monomer include, for example, aromatic divinyl compounds such as divinylbenzene, divinylnaphthalene and derivatives thereof; ester compounds such as ethylene glycol dimethacrylate and diethylene glycol dimethacrylate, in which two or more carboxylic acids are esterified to alcohol having two or more hydroxyl groups; and other divinyl compounds such as N,N-divinylaniline and divinyl ether.

These monomers can be used alone or in combination of two or more kinds. It is particularly preferable to use the monovinyl monomer in combination with the cross-linkable polymerizable monomer, and cross-linkable resin fine particles can be obtained by combining these monomers. Among the above-listed monovinyl monomers, preferred are styrenes and derivatives thereof and (meth)acrylic acid esters. More preferred are styrenes and derivatives thereof. Particularly preferred is styrene. Among the above-listed cross-linkable polymerizable monomers, preferred are aromatic divinyl compounds and ester compounds in which two or more (meth)acrylic acids are esterified to alcohol having two or more hydroxyl groups. More preferred are aromatic divinyl compounds, and particularly preferred is divinylbenzene.

The ratio of the preferably used monovinyl monomer and cross-linkable polymerizable monomer is such that among all monomers, the ratio of the cross-linkable polymerizable monomer is preferably 0.1 to 20% by mass of the total, more preferably 0.3 to 10% by mass, still more preferably 0.5 to 5% by mass.

The emulsifier used in latex emulsion polymerization is not limited to a specific emulsifier. Examples of the emulsifier include anionic emulsifiers such as alkyl benzene sulfonate, aliphatic sulfonate and fatty alcohol sulfate; nonionic emulsifiers such as polyethylene glycol alkyl ether type emulsifier, polyethylene glycol alkyl ester type emulsifier and polyethylene glycol alkyl phenyl ether type emulsifier; and ampholytic surfactants having carboxylate salt, sulfate ester salt, sulfonic acid salt, phosphoric salt, phosphate ester salt or the like as the anion site, and amine salt, quaternary ammonium salt or the like as the cation site.

The used amount of the emulsifier is generally 0.05 to 5 parts by mass, preferably 0.05 to 2 parts by mass, with respect to the total amount of all monomers used in the emulsion polymerization of 100 parts by mass.

The polymerization initiator used in the latex emulsion polymerization is not limited to a specific polymerization initiator. Concrete examples of the polymerization initiator include inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, benzoyl peroxide, 3,5,5-trimethylhexanoyl peroxide and t-butylperoxy isobutyrate; and azo compounds such as azobisisobutyronitrile, azobis-2,4-dimethylvaleronitrile, azobiscyclohexanecarbonitrile, azobismethylisobutyrate. Preferred are inorganic peroxides. These polymerization initiators can be used alone or in combination of two or more kinds. It is also possible to used redox polymerization initiators obtained by mixing these polymerization initiators with a reductant such as sodium sulfite.

The used amount of the polymerization initiator is generally 0.1 to 5 parts by mass, preferably 0.5 to 3 parts by mass, with respect to the total amount of all monomers used in the emulsion polymerization of 100 parts by mass. In the case of performing the emulsion polymerization in multiple steps, all of the polymerization initiator can be added in the first step, or a part of the polymerization initiator can be added in the first step and the rest in the second and successive steps. In each step, the method of adding the polymerization initiator can be any one of single addition, continuous addition and split addition.

In the latex emulsion polymerization, auxiliary raw materials which are generally used in emulsion polymerization, such as a molecular weight modifier, a dispersant and a chelant, can be added. There is no particular limitation on the type and amount of the auxiliary raw materials. In the case of performing the emulsion polymerization in multiple steps, the time and method of adding the auxiliary raw materials used as needed, are not particularly limited.

Concrete examples of the molecular weight modifier include α-methylstyrene dimer; mercaptans such as t-dodecyl mercaptan, n-dodecyl mercaptan and octyl mercaptan; halogenated hydrocarbons such as carbon tetrachloride, methylene chloride and methylene bromide; and sulfur-containing compounds such as tetraethyl thiuram disulfide, dipentamethylene thiuram disulfide and diisopropyl xanthogen disulfide. These molecular weight modifiers can be used alone or in combination of two or more kinds.

In the emulsion polymerization, the polymerization temperature is not limited to a specific range. The polymerization temperature is generally 5 to 95° C., preferably 50 to 95° C. In the case of performing the emulsion polymerization in multiple steps, the polymerization temperatures of the steps can differ. In the emulsion polymerization of each step, the polymerization temperature can be changed.

The resin particles preferably have a number average particle diameter of 10 to 300 nm, more preferably 20 to 200 nm. This is because it is preferable that the below-described complex fine particles have a number average particle diameter of 30 to 300 nm.

It is possible to cover the resin fine particles of the present invention with a continuous layer of silica by a silica coating technique using a sol-gel method. In particular, the silica coating using the sol-gel method is performed by the following method. After the resin fine particles to be mother particles are dispersed in water in which silane alkoxide is dissolved and/or an aqueous medium in which silane alkoxide is dissolved, the thus-obtained dispersion solution is added dropwise into an aqueous medium and/or water mixed with alkali, or an aqueous medium or water mixed with alkali is added dropwise into the dispersion solution. By this method, the silane alkoxide dissolved in the dispersion solution containing the resin fine particles, causes hydrolysis and polycondensation in the presence of alkali, and then it is gradually changed to be insoluble. Moreover, the silane alkoxide is deposited on the surface of the resin fine particles by hydrophobic interaction. As a result, silica-containing particulate masses are attached to each other, thus forming a coating layer on the surface of the resin fine particles. In this method, in order to selectively coat the surface of the resin fine particles with the silica-containing particulate masses, after the resin fine particles to be mother particles are dispersed in an aqueous medium and/or water in which silane alkoxide is dissolved, the resin fine particles can be dispersed in the medium in which silane alkoxide is dissolved, by stirring and, if necessary, heating.

It is preferable to produce the resin fine particles, which are used to produce the core-shell type complex fine particles in which the resin fine particles are covered with silica, by emulsion polymerization, as described above. The subsequent covering of the resin fine particles with silica can be performed by the sol-gel method, after the resin fine particles are washed, filtrated, dried and then dispersed in a solvent. However, from the viewpoint of reducing the number of the steps, it is preferable to perform the covering by the sol-gel method while the resin fine particles are in the state of emulsion.

The following are examples of the silane alkoxide used above. There may be mentioned bifunctional or higher-functional alkoxides such as tetramethoxysilane, methyltriethoxysilane, hexyltriethoxysilane, triethoxychlorosilane, di-t-butoxydiacetoxysilane, hydroxymethyltriethoxysilane, tetraethoxysilane, tetra-n-propoxysilane, tetrakis(2-methacryloxyethoxysilyl)silane, allyltriethoxysilane, allyltrimethoxysilane, 3-aminopropyltriethoxysilane, bis(triethoxysilyl)ethylene, bis(triethoxysilyl)methane, bis (triethoxysilyl)1,7-octadiene, 2,2-(chloromethyl) allyltrimethoxysilane, ((chloromethyl)phenylethyl) trimethoxysilane, 1,3-divinyltetraethoxydisiloxane, 2-(3,4-epoxycyclohexyl)ethyltrimethoxysilane, (3-glycidoxypropyl)methyldiethoxysilane, (3-glycidoxypropyl)methyldimethoxysilane, (3-glycidoxypropyl)trimethoxysilane, 3-mercaptopropyltriethoxysilane, methacrylamidopropyltriethoxysilane, methacryloxymethyltriethoxysilane, methacryloxymethyltrimethoxysilane, 7-octenyltrimethoxysilane, vinylmethyldiethoxysilane, vinylmethyldimethoxysilane, vinyltriethoxysilane and vinyltriphenoxysilane. It is preferable to use a tetrafunctional silane alkoxide such as tetramethoxysilane, tetraethoxysilane and tetra-n-propoxysilane or tetrakis(2-methacryloxyethoxysilyl)silane, as an essential component.

Monofunctional silane alkoxides which can be used in combination with the above-mentioned bifunctional or higher-functional silane alkoxides are (3-acryloxypropyl) dimethylmethoxysilane, o-acryloxy(polyethyleneoxy)trimethylsilane, acryloxytrimethylsilane, 1,3-bis(methacryloxy)-2-trimethylsiloxypropane-3-chloro-2-trimethylsiloxypropene, (cyclohexenyloxy)trimethylsilane, methacryloxyethoxytrimethylsilane and (methacryloxymethyl)dimethylethoxysilane, for example. These silane alkoxides can be used alone or in combination of two or more kinds.

A suitable method for covering the resin fine particles of the present invention with a continuous layer of an inorganic component such as alumina, is the use of a covering technique by the sol-gel method. The method will be explained in detail, taking titania covering by the sol-gel method as an example.

After the resin fine particles to be mother particles are dispersed in water in which titanium alkoxide is dissolved and/or an aqueous medium in which titanium alkoxide is dissolved, the thus-obtained dispersion solution is added dropwise into an aqueous medium and/or water mixed with alkali, or an aqueous medium and/or water mixed with alkali is added dropwise into the dispersion solution. By this method, the titanium alkoxide dissolved in the dispersion solution containing the resin fine particles, causes hydrolysis and polycondensation in the presence of alkali, and then it is gradually changed to be insoluble. Moreover, the titanium alkoxide is deposited on the surface of the resin fine particles by hydrophobic interaction. As a result, titania-containing particulate masses are attached to each other, thus forming a coating layer on the surface of the resin fine particles. In this method, in order to selectively coat the surface of the resin fine particles with the titania-containing particulate masses, after the resin fine particles to be mother particles are dispersed in an aqueous medium and/or water in which titanium alkoxide is dissolved, the resin fine particles can be dispersed in the medium in which titanium alkoxide is dissolved, by stirring and, if necessary, heating.

The following are examples of the titanium alkoxide used above. There may be mentioned bifunctional or higher-functional titanium alkoxides such as tetramethoxytitanium, tetraethoxytitanium, tetra(n-propoxy)titanium, tetra(i-propoxy)titanium, tetra(n-butoxy)titanium, tetra(i-butoxy)titanium, tetra(s-butoxy)titanium, tetra(t-butoxy)titanium, tetra(n-pentoxy)titanium and tetra(n-hexyloxy)titanium.

In the present invention, the resin fine particles can be suitably covered with a continuous layer of alumina by alumina covering by the sol-gel method. The following are aluminum alkoxides that can be used in the sol-gel method. There may be mentioned bifunctional or higher-functional aluminum alkoxides such as trimethoxyaluminum, triethoxyaluminum, tri(n-propoxy)aluminum, tri(i-propoxy)aluminum, tri(n-butoxy)aluminum, tri(i-butoxy)aluminum, tri(s-butoxy)aluminum, tri(t-butoxy)aluminum, tri(n-pentoxy)aluminum and tri(n-hexyloxy)aluminum.

In the present invention, the resin fine particles can be also suitably covered with a continuous layer of zirconia by zirconia covering by the sol-gel method. The following are zirconium alkoxides that can be used in the sol-gel method. There may be mentioned bifunctional or higher-functional zirconium alkoxides such as tetramethoxyzirconium, tetraethoxyzirconium, tetra(n-propoxy)zirconium and tetra(n-butoxy)zirconium.

The resin fine particles can be covered with any one of silica, alumina, titania and zirconia, or with a mixture of two or more of these inorganic components.

As the aqueous medium used in the sol-gel reaction, for example, alcohols such as methanol, ethanol and isopropanol can be used. If there is an increase in the organic nature of these solvents, the solubility of a polycondensation product of the alkoxide, which is an inorganic component, is increased and thus polycondensation product is unlikely to deposit on the surface of the particles. Therefore, it is preferable to use methanol or ethanol as the aqueous medium.

To make the core-shell type complex fine particles produced by the above method exert stable effects in the environment of high temperature and high humidity, it is preferable to hydrophobize the surface of the core-shell type complex fine particles. As the hydrophobizing agent used for the hydrophobization, any of positively-charged and negatively-charged hydrophobizing agents can be used. For example, there may be used a silane coupling agent, silicone oil, etc., as the hydrophobizing agent.

Examples of the silane coupling agent include disilazanes such as hexamethyldisilazane; cyclic silazanes; trimethylsilane; trimethylchlorosilane; alkylsilane compounds such as dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-octadecyltrimethoxysilane, vinyltrimethoxysilane, vinyltriethoxysilane, γ-methacryloxypropyltrimethoxysilane and vinyltriacetoxysilane; and aminosilane compounds such as γ-aminopropyltriethoxysilane, γ-(2-aminoethyl)aminopropyltrimethoxysilane, γ-(2-aminoethyl)aminopropylmethyldimethoxysilane, N-phenyl-3-aminopropyltrimethoxysilane, N-(2-aminoethyl)-3-aminopropyltrimethoxysilane and N-β-(N-vinylbenzylaminoethyl)-γ-aminopropyltrimethoxysilane. They can be used alone or in combination of two or more kinds.

Examples of the silicone oil include dimethylpolysiloxane, methylhydrogenpolysiloxane, methylphenylpolysiloxane and amino-modified silicone oil. They may be used alone or in combination of two or more kinds.

The hydrophobizing agent may be one kind or two or more kinds of the above. It is more preferable to use a silane coupling agent or silicone oil because the thus-obtained toner provides excellent image quality.

As the method for hydrophobizing the core-shell type complex fine particles used in the present invention as an external additive, there may be used common methods. The examples include wet methods and dry methods.

In particular, there may be mentioned the following, for example: a dry method of adding dropwise or spraying the hydrophobizing agent, while stirring the core-shell type complex fine particles used as an external additive; and a wet method of adding the core-shell type complex fine particles to a hydrophobizing agent-containing organic solvent, while stirring the organic solvent, the solvent being obtained by dissolving the hydrophobizing agent in an organic solvent. Preferred are wet methods because it is possible to uniformly hydrophobize the core-shell type complex fine particles.

In the case of using the wet method, hydrophobization can be carried out by using a reaction solution as it is, which is obtained by adding a hydrophobizing agent-containing organic solvent to a reaction solution of core-shell type complex fine particles obtained by a sol-gel reaction, while stirring the reaction solution of the core-shell type complex fine particles. Or, to the contrary, hydrophobization can be carried out by adding a reaction solution of core-shell type complex fine particles obtained by a sol-gel reaction to a hydrophobizing agent-containing organic solvent, while stirring the hydrophobizing agent-containing organic solvent.

In the wet method, however, preferred is a method in which core-shell type complex fine particles obtained by a sol-gel reaction are washed, filtrated, dried and then dispersed in an organic solvent, and then a hydrophobizing agent is brought into contact therewith. The hydrophobized core-shell type complex fine particles obtained by the preferred method and dispersed in the organic solvent, are dried after removing the organic solvent therefrom by vacuum distillation, and pulverized as needed for use.

4. Core-Shell Type Complex Fine Particles

The core-shell type complex fine particles are obtained by the above-described production method. Hereinafter, the core-shell type complex fine particles used in the present invention as an external additive, will be explained.

The core-shell type complex fine particles used in the present invention as an external additive are core-shell type complex fine particles in which resin fine particles are covered with at least one inorganic component.

Hereinafter, the numerical range of the volume ratio of the inorganic component in the case where the inorganic component is silica, that is, the numerical range of the volume ratio of the silica component, will be explained. The volume ratio of the silica component of the core-shell type complex fine particles is 45 to 75% by volume when the total volume of the complex fine particles is 100% by volume. When the volume ratio is less than 45% by volume, there is a possibility that the flowability of the below-described toner is decreased. On the other hand, when the volume ratio is more than 75% by volume, there is a possibility that the environmental stability of the below-described toner is deteriorated and severe fog is produced by the toner in the environment of high temperature and high humidity.

When the total volume of the core-shell type complex fine particles is 100% by volume, the volume ratio of the silica component of the complex fine particles is more preferably 50 to 70% by volume, more preferably 55 to 65% by volume.

Hereinafter, there will be explained the numerical range of the volume ratio of the inorganic component in the cases where alumina, titania and zirconia are used as the inorganic component each. When the total volume of the core-shell type complex fine particles is 100% by volume, the volume ratio of the inorganic component of the complex fine particles is preferably 25 to 75% by volume.

When the volume ratio is less than 25% by volume, the amount of the metal oxide is small, so that there is a possibility that the effect of preventing an increase in toner charge amount in the environment of low temperature and low humidity (L/L), is not exerted. On the other hand, when the volume ratio is more than 75% by volume, the amount of the metal oxide is large, so that there is a possibility that toner charge amount is likely to decrease in the environment of high temperature and high humidity (H/H), resulting in severe fog.

When the total volume of the core-shell type complex fine particles is 100% by volume, the volume ratio of the inorganic component of the complex fine particles is more preferably 30 to 70% by volume, still more preferably 45 to 70% by volume, and particularly preferably 50 to 70% by volume.

When the inorganic component contains two or more inorganic components selected from the group consisting of silica, alumina, titania and zirconia, the total volume ratio of the inorganic component of the core-shell type complex fine particles when the total volume of the complex fine particles is 100% by volume, is preferably 45 to 75% by volume, more preferably 50 to 70% by volume, and still more preferably 55 to 70% by volume.

In the present invention, the volume ratio of the inorganic component of the core-shell type complex fine particles means the ratio of the inorganic component covering the complex fine particles, namely, silica, alumina, titania and/or zirconia, to the total volume of the core-shell type complex fine particles. That is, the ratio is the ratio of an amount of increase from the volume of the resin fine particles, which is a raw material, to the volume of the core-shell type complex fine particles, to the total volume of the core-shell type complex fine particles. The ratio can be calculated from the number average particle diameter of the resin fine particles and that of the core-shell type complex fine particles.

To calculate the volume ratio of the inorganic component of fine particles when it is not clear whether the fine particles are core-shell type complex fine particles or not, the following method can be used, for example.

First, it is determined whether the fine particles contain silicon, aluminum, titanium and/or zirconium, by using atomic absorption spectrometry, etc.

When the fine particles are found to contain silicon, aluminum, titanium and/or zirconium, the number average particle diameter of the fine particles are calculated in the same manner as the above-described method. Then, the fine particles are mixed with hydrofluoric acid to dissolve silica, alumina, titania and/or zirconia, washed with water and then dried to measure the number average particle diameter of resin fine particles to be cores, in the same manner as above. The volume ratio of the inorganic component of the fine particles can be calculated from the two number average particle diameters before and after the dissolution of the inorganic component, which were measured as explained above.

The core-shell type complex fine particles preferably have a moisture absorption amount of 0.5 to 2.5% by mass. When the moisture absorption amount is less than 0.5% by mass or more than 2.5% by mass, there is a possibility that the environmental stability of the below-described toner is deteriorated and severe fog is produced by the toner in the environment of high temperature and high humidity.

The moisture absorption amount of the core-shell type complex fine particles is more preferably 0.5 to 2.0% by mass, still more preferably 0.8 to 1.5% by mass.

In the present invention, the moisture absorption amount is measured as follows. A sample was allowed to stand for one hour under a dry nitrogen flow with a moisture adsorption-desorption measuring device (product name: IGAsorp; manufactured by: Nihon Siberhegner K. K.) Then, water is adsorbed to the sample for one hour in the air of 32° C. and a humidity of 80% to measure the mass of the water absorbing-sample. From the measurement result, (increased mass/sample mass)×100 was defined as moisture absorption amount (% by mass).

It is preferable that the core-shell type complex fine particles are positively charged. In the case of using negatively-charged core-shell type complex fine particles, there is a possibility that toner charge amount is decreased and fog is likely to occur.

The blowoff charge amount of the core-shell type complex fine particles is preferably +1000 to +4000 μC/g. When the amount is less than +1000 μC/g, there is a possibility that toner charge amount is decreased and fog is likely to occur. On the other hand, when the amount is more than +4000 μC/g, it is difficult to produce the core-shell type complex fine particles.

The blowoff charge amount of the core-shell type complex fine particles is more preferably +1500 to +3000 μC/g, still more preferably +1700 to +2500 μC/g.

The core-shell type complex fine particles preferably have a number average particle diameter of 30 to 300 nm. When the number average particle diameter is less than 30 nm, there is a possibility that toner charge amount is decreased and fog is likely to occur. When the number average particle diameter is more than 300 nm, there is a possibility that the environmental stability of the below-described toner is deteriorated and severe fog is produced by the toner in the environment of high temperature and high humidity.

The number average particle diameter of the core-shell type complex fine particles is more preferably 40 to 250 nm, still more preferably 50 to 200 nm.

5. Method for Producing the Toner of the Present Invention

The toner of the present invention can be obtained by suitably adding and attaching (adding) the core-shell type complex fine particles to the surface of the colored resin particles by mixing the colored resin particles with the core-shell type complex fine particles and stirring the mixture.

The added amount of the core-shell type complex fine particles is preferably 0.1 to 2.0 parts by mass with respect to 100 parts by mass of the colored resin particles. When the added amount of the core-shell type complex fine particles is less than 0.1 part by mass with respect to 100 parts by mass of the colored resin particles, the effects of the present invention are not fully exerted. On the other hand, when the added amount of the core-shell type complex fine particles is more than 2.0 parts by mass with respect to 100 parts by mass of the colored resin particles, there is a possibility that the charge amount of the toner is decreased.

The added amount of the core-shell type complex fine particles is preferably 0.15 to 1.0 part by mass, more preferably 0.2 to 0.8 part by mass, with respect to 100 parts by mass of the colored resin particles.

The method for attaching (adding) the core-shell type complex fine particles to the surface of the colored resin particles is not particularly limited. It can be performed with a device which can perform mixing and stirring. Examples of the device include high-speed stirrers such as FM Mixer (product name; manufactured by: Mitsui Mining Co., Ltd.), Super Mixer (product name; manufactured by: Kawata Mfg. Co., Ltd.), Q Mixer (product name; manufactured by: Mitsui Mining Co., Ltd.), Mechanofusion System (product name; manufactured by: Hosokawamicron Corporation) and Mechanomill (product name; manufactured by: Okada Seiko Co., Ltd.)

An other external additive can be used and mixed in combination with the core-shell type complex fine particles.

Examples of the other external additive include inorganic fine particles comprising silica, titanium oxide, aluminum oxide, zinc oxide, tin oxide, calcium carbonate, calcium phosphate and/or cerium oxide, and organic fine particles such as polymethyl methacrylate resin, silicone resin and/or melamine resin. Preferred are inorganic fine particles. Of inorganic fine particles, silica and/or titanium oxide is preferred, and fine particles comprising silica is particularly preferred.

The other external additive used in combination with the core-shell type complex fine particles, may be only one kind of external additive or two or more kinds of external additives.

The added amount of the other external additive is preferably 0.1 to 6 parts by mass, more preferably 0.3 to 5 parts by mass, still more preferably 0.5 to 4 parts by mass.

In the case of using the core-shell type complex fine particles in combination with the other external additive, the other external additive preferably has a number average particle diameter of 7 to 300 nm. When the number average particle diameter of the other external additive is less than 7 nm, the other external additive is likely to be transferred to the inside of the colored resin particles from the surface of the particles, so that the toner particles cannot be provided with sufficient flowability and there is a possible negative impact on printing performance. On the other hand, when the number average particle diameter of the other external additive is more than 300 nm, the ratio of the other external additive to the surface of each toner particle (coverage), is decreased, so that the toner particles cannot be provided with sufficient flowability and there is a possible negative impact on printing performance.

The number average particle diameter of the other additive is more preferably 15 to 80 nm.

6. Toner of the Present Invention

Because of using as an external additive the core-shell type complex fine particles in which the resin fine particles are covered with silica, the first toner of the present invention obtained through the above process is a toner for developing electrostatic images, which provides the toner particles with a stable charge property over time, which is unlikely to cause a deterioration in image quality by fog or the like even in the case of continuous printing of a large number of sheets, and which has excellent flowability.

Because of using as an external additive the core-shell type complex fine particles in which the resin fine particles are covered with alumina, titania and/or zirconia, the second toner obtained through the above process is a toner for developing electrostatic images, which prevents an increase in toner charge amount in the environment of low temperature and low humidity, which performs stable printing in the same environment without a deterioration in thin line reproducibility, and which prevents printing failure caused by an increase in charge amount and provides excellent image quality, therefore.

The toner of the present invention preferably has a flowability of 80 to 100, which is measured by the method described below. "Flowability" is a value of the ratio of the toner not remaining on a sieve as a result of sifting, the value being expressed in percentage, to the total mass of the entire toner.

The toner of the present invention more preferably has a flowability of 82 to 100, still more preferably 85 to 100.

To measure the flowability, there may be mentioned the following method, for example. First, a sieve having a fixed aperture size is prepared. There may be used two or more kinds of sieves. In the case of using two or more kinds of sieves, the sieves are stacked in descending order of the aperture size for use so that one with the largest aperture size, is on the top.

Next, a predetermined amount of toner sample is put on the sieve. In the case of using two or more kinds of sieves, the toner sample is placed on the top sieve, that is, the sieve with the largest aperture size.

Then, by means of a powder measuring device, the sieve is vibrated for a fixed time under a constant vibration condition to measure the mass of the toner remaining on the sieve. In the case of using two or more kinds of sieves, the mass of the toner remaining on each sieve, is measured.

Finally, the ratio of the mass of the toner remaining on the sieve to the total mass of the entire toner, is calculated. The value of the ratio of the toner not remaining on the sieve as a result of sifting, the value being expressed in percentage and the ratio being calculated based on the above-obtained ratio, to the total mass of the entire toner, is defined as flowability. In the case of using two or more kinds of sieves, after the ratio of the mass of the toner remaining on each sieve is calculated, the thus-obtained ratios are added up to calculate flowability. In this case, flowability can be also calculated by assigning each sieve a coefficient of 1 or less, obtaining, for each sieve, the product of the coefficient and the mass of the toner remaining on the sieve, and then adding up the thus-obtained products. For example, in the case of using two kinds of sieves, assume that a coefficient of 1 is assigned to a sieve with the largest aperture size, that is, sieve A, while a coefficient of 0.6 is assigned to a sieve with the smallest aperture size, that is, sieve B. In this case, flowability is calculated based on $(\alpha + 0.6\beta)$, which is the value obtained by adding up (1) the product of coefficient 1 and the ratio of the mass of the toner remaining on sieve A, that is, ratio $\alpha$, and (2) the product of coefficient 0.6 and the ratio of the mass of the toner remaining on sieve B, that is, ratio $\beta$. As just described, by appropriately assigning a coefficient, toner flowability can be evaluated more accurately.

EXAMPLES

Hereinafter, the present invention will be explained in more detail, by way of examples and comparative examples. The present invention is not limited to these examples only, however. All designations of part or parts and % are expressed on mass basis, unless otherwise noted.

The test method used in examples and comparative examples is as follows.

Example Series I

I-1. Production of Core-Shell Type Complex Fine Particles

Production Example I-1

In a container being furnished with a stirrer and having the inside air replaced by nitrogen, 3 parts of soft type dodecylbenzenesulfonic acid was dissolved in 150 parts of ion-exchanged water. Then, 95 parts of styrene was emulsified therein to produce an emulsion of polymerizable monomer. After increasing the emulsion temperature to 80° C., 0.6 part of potassium persulfate dissolved in 10 parts of ion-exchanged water, was added thereto and polymerized for two hours. Then, after decreasing the temperature of the reactor to 40° C., 5 parts of divinylbenzene was added thereto and stirred for two hours. Thereafter, the temperature of the mixture was increased to 85° C., and 0.1 part of potassium persulfate dissolved in 2 parts of water, was added thereto to carry out a polymerization reaction for four hours. A hydroquinone aqueous solution, which is a stop agent, was added thereto to complete the polymerization. The polymerization conversion rate was 99% at this time. Water-soluble substances were removed therefrom by ultrafiltration. The pH and concentration of the resultant was controlled to obtain an emulsion of resin fine particles having a solid content concentration of 50% and a pH of 8.5. A part of the emulsion was dried and used for the below-described measurement of the number average particle diameter of the resin fine particles.

After 200 parts of the thus-obtained emulsion (solid content equivalent: 100 parts) was added to 10,000 parts of methanol, 600 parts of tetraethoxysilane and 150 parts of 1-methyltriethoxysilane, both of which are silicon compounds, were dissolved therein. In this state, the mixture was heated to 50° C. and stirred for one hour to disperse the resin fine particles in the medium in which silane alkoxide is dissolved. Then, 20 parts of a 28% by mass $NH_4OH$ aqueous solution was added dropwise to the solution and stirred at room temperature for 48 hours to carry out a sol-gel reaction, thus covering the surface of the resin fine particles with silica.

After the reaction was completed, the thus-obtained particles were washed with ion-exchanged water and then with methanol, followed by filtration separation and drying at 45° C. for 24 hours under a reduced pressure of 40 kPa, thereby obtaining core-shell type complex fine particles I-1 in which the resin fine particles are covered with silica. Part of the core-shell type complex fine particles I-1 was used for the below-described measurement of the number average particle diameter of the core-shell type complex fine particles.

Then, 100 g of the core-shell type complex fine particles I-1 was dispersed in 600 g of toluene. After 3-aminopropyltriethoxysilane (a silane compound containing an amino group) was added thereto at a ratio of 1 part (3-aminopropyltriethoxysilane) to 100 parts (the mass of the silica contained in the fine particles), the mixture was mixed and dispersed for 15 minutes to bring 3-aminopropyltriethoxysilane into contact with the fine particles. Next, after 1 part of trifluoropropyltrimethoxysilane (a silane compound containing no amino group) was added to the fine particles, the mixture was mixed and dispersed for 15 minutes to bring trifluoropropyltrimethoxysilane into contact with the fine particles. After the resulting dispersion liquid was distilled under reduced pressure and dried, the fine particles were pulverized to obtain positively-charged, hydrophobized core-shell type complex fine particles I-A. The hydrophobizing treatment made no change to the particle diameter of the fine particles.

Production Example I-2

Core-shell type complex fine particles I-B was produced in the same manner as the production example I-1, except the following: an emulsion of resin fine particles having a number average particle diameter of 50 nm was obtained as a result of changing the added amount of the soft type dodecylbenzenesulfonic acid from 3 to 8 parts and polymerization, and upon the production of core-shell type complex fine particles, the added amount of tetraethoxysilane was changed from 600 to 700 parts and that of 1-methyltriethoxysilane was changed from 150 to 200 parts.

Production Example I-3

Core-shell type complex fine particles I-C was produced in the same manner as the production example I-1, except that the time of sol-gel reaction was changed from 48 to 72 hours.

Production Example I-4

Core-shell type complex fine particles I-D was produced in the same manner as the production example I-1, except that an emulsion of resin fine particles having a number average particle diameter of 150 nm was obtained as a result of changing the added amount of the soft type dodecylbenzenesulfonic acid from 3 to 0.8 part and polymerization, and upon the production of core-shell type complex fine particles, the added amount of tetraethoxysilane was changed from 600 to 500 parts and that of 1-methyltriethoxysilane was changed from 150 to 120 parts.

Production Example I-5

Core-shell type complex fine particles I-E was produced in the same manner as the production example I-1, except that the polymerizable monomer used in the first polymerization was changed from 95 parts of styrene and 5 parts of divinylbenzene to 100 parts of styrene, and 5 parts of divinylbenzene, which was added later in the production example I-1, was not used.

Production Example I-6

After 1.0 part by mass of acryl/styrene-based resin fine particles (product name: MP-5500; manufactured by: Soken Chemical & Engineering Co., Ltd.; number average particle diameter 400 nm) were dispersed in 100 parts by mass of methanol, 20 parts by mass of tetraethoxysilane and 5.0 parts by mass of methyltriethoxysilane, both of which are silane compounds, were dissolved therein. In this state, the mixture was heated to 50° C. and stirred for one hour to disperse the resin fine particles in the medium in which silane alkoxide is dissolved. Then, 20 parts by mass of a 28% by mass $NH_4OH$ aqueous solution was added dropwise to the solution and stirred at room temperature for 48 hours to carry out a sol-gel reaction, thus covering the surface of the resin fine particles with silica.

After the reaction was completed, the thus-obtained particles were washed with purified water and then with methanol, followed by filtration separation and drying, thereby producing core-shell type complex fine particles I-F in which the resin fine particles are covered with silica.

Production Example I-7

Core-shell type complex fine particles I-G was produced in the same manner as the production example I-6, except that the acryl/styrene-based resin fine particles (product name: MP-5500; manufactured by: Soken Chemical & Engineering Co., Ltd.; number average particle diameter 400 nm) of 1.0 part by mass was changed to 1.0 part by mass of acryl/styrene-based resin fine particles (product name: MP-1450; manufactured by: Soken Chemical & Engineering Co., Ltd.; number average particle diameter 250 nm).

I-2. Evaluation of the Properties of the Complex Fine Particles, Etc

The core-shell type complex fine particles I-A to I-G obtained in the production examples I-1 to I-7, hydrophobized silica fine particles (product name: H05TA; manufactured by: Clariant Corp.; hereinafter may be referred to as silica fine particles I-A) and hydrophobized silica fine particles (product name: TG-C321; Cabot Corporation; hereinafter may be referred to as silica fine particles I-B) were each measured for number average particle diameter, moisture absorption amount and charge amount. For each of the core-shell type complex fine particles I-A to I-G, the number average particle diameter of the resin fine particles, which is a raw material of the complex fine particles I-A to I-G, was measured to calculate the ratio of the silica component of the core-shell type complex fine particles.

I-2-1. Measurement of the Number Average Particle Diameter of the Core-Shell Type Complex Fine Particles, Etc., and that of the Resin Fine Particles, which is a Raw Material The number average particle diameter of the core-shell type complex fine particles, etc., and that of the resin fine particles, which is a raw material, were measured by the following method. In particular, a photograph of the complex fine particles and that of the resin fine particles were taken with a field emission scanning electron microscope (product name: S-4700; manufactured by: Hitachi, Ltd.) at 10.000-fold magnification. For each picture, the equivalent circle diameter of each fine particle (corresponding to the projected area diameter of each fine particle) was calculated with an image analyzer (product name: LUZEX IID; manufactured by: Nireco Corporation) in the condition that the maximum ratio of particle area to frame area is 2% and the total number of processed particles is 100. Finally, the average of the obtained diameters was obtained.

I-2-2. Calculation of the Ratio of the Silica Component of the Core-Shell Type Complex Fine Particles For each of the core-shell type complex fine particles I-A to I-G, the ratio of the volume of the covered silica to the volume of the whole core-shell type complex fine particles, was calculated by the following formula.

$$[\text{Silica component ratio}] = [\{(4/3)\pi(r_2/2)^3 - (4/3)\pi(r_1/2)^3\}/\{(4/3)\pi(r_2/2)^3\}] \times 100 = \{(r_2^3 - r_1^3)/(r_2^3)\} \times 100$$

In this formula, $r_1$ is the number average particle diameter of the resin fine particles to be cores, and $r_2$ is the number average particle diameter of the core-shell type complex fine particles.

I-2-3. Measurement of Moisture Absorption Amount

A moisture sorption-desorption analyzer (product name: IGAsorp; manufactured by: Hiden Isochema) was used for the measurement of moisture absorption amount. Inside the analyzer, the core-shell type complex fine particles, etc., which are samples, were allowed to stand under a dry nitrogen flow for one hour. Then, the dry mass of the samples were measured. Thereafter, moisture was adsorbed onto the samples in the air at a temperature of 32° C. and at a humidity of 80% to measure the mass of the moisture-absorbing samples.

The moisture absorption amount (% by mass) was calculated by the following formula:

$$\{(\text{Mass of the water-absorbing sample}) - (\text{Mass of the dried sample})/(\text{Mass of the dried sample})\} \times 100.$$

I-2-4. Measurement of Charge Amount

Here, 9.95 g of a carrier (product name: F96-80; manufactured by: Powdertech Corporation) and 0.05 g of each sample were put in a 100 cc glass bottle. The bottle was rotated for 30 minutes at a rotational frequency of 150 times per minute, followed by blowing with a blowoff meter (product name: TB-203; manufactured by: Toshiba Chemical Corporation) at a nitrogen gas pressure of 4.5 kPa and then suction at a pressure of 9.5 kPa, to measure the blowoff charge amount.

The measurement was conducted in the environment at a temperature of 23° C. and a relative humidity of 50%. It is possible to find the charge polarity of external additive by this blowoff charge amount measurement.

$$\text{Frictional charge amount } (\mu C/g) = \text{Charge amount of measurement sample mixture } (\mu C)/(\text{Mass of measurement sample compound } (g) \times \text{Concentration of measurement sample (\% by mass)})$$

For the core-shell type complex fine particles I-A to I-G and the silica fine particles I-A and I-B, measurement results of moisture absorption amount, charge property and charge amount are shown in Table I-1, in conjunction with structural data of the external additive particles. In the table below, "external additive (I-A)" refers to the core-shell type complex fine particles I-A to I-G and the silica fine particles I-A and I-B.

TABLE 1

Table I-1

| | | Complex fine particles I-A | Complex fine particles I-B | Complex fine particles I-C | Complex fine particles I-D | Complex fine particles I-E | Silica fine particles I-A | Silica fine particles I-B | Complex fine particles I-F | Complex fine particles I-G |
|---|---|---|---|---|---|---|---|---|---|---|
| Structural data of external additive (I-A) | Number average particle diameter of resin fine particles to be cores (nm) | 80 | 50 | 80 | 150 | 80 | — | — | 400 | 250 |
| | Number average particle diameter of external additive (I-A) (nm) | 105 | 65 | 120 | 200 | 105 | 40 | 70 | 480 | 260 |
| | Volume ratio of silica component of external additive (I-A) (% by volume) | 56 | 54 | 70 | 58 | 56 | 100 | 100 | 42 | 11 |

TABLE 1-continued

Table I-1

|  |  | Complex fine particles I-A | Complex fine particles I-B | Complex fine particles I-C | Complex fine particles I-D | Complex fine particles I-E | Silica fine particles I-A | Silica fine particles I-B | Complex fine particles I-F | Complex fine particles I-G |
|---|---|---|---|---|---|---|---|---|---|---|
| Polymerizable monomer | Content of monovinyl monomer (parts) | 95 | 95 | 95 | 95 | 100 | — | — | 100 | 100 |
|  | Content of cross-linkable polymerizable monomer (parts) | 5 | 5 | 5 | 5 | 0 | — | — | 0 | 0 |
| Properties of external additive (I-A) | Moisture absorption amount (%) | 1.4 | 1 | 0.75 | 1.2 | 1.4 | 0.25 | 2.0 | 2.8 | 3.0 |
|  | Charge property | Positively charged | Positively charged | Positively charged | Positively charged | Positively charged | Positively charged | Positively charged | Negatively charged | Negatively charged |
|  | Charge amount (µC/g) | 2200 | 2000 | 2600 | 1000 | 2200 | 3300 | 1900 | −1300 | −2000 |

I-3. Production and Property Evaluation of Colored Resin Particles

I-3-1. Production of a Polymerizable Monomer Composition for Cores

The following were mixed by stirring with a stirrer and then uniformly dispersed with a media type dispersing device: 83 parts of styrene and 17 parts of n-butyl acrylate as a monovinyl monomer; 7 parts of carbon black (product name: #25B; manufactured by: Mitsubishi Chemical Corporation) as a black colorant; 1 part of a positively-charged charge control agent (product name: FCA-207P; Fujikura Kasei Co., Ltd.; quaternary ammonium base-containing styrene/acrylic resin) as a charge control agent; 0.6 part of divinylbenzene as a cross-linkable polymerizable monomer; 1.9 parts of t-dodecyl mercaptan as a molecular weight modifier; and 0.25 part of polymethacrylic acid ester macromonomer (product name: AA6; TOAGOSEI Co., Ltd.; Tg of the polymer to be obtained=94° C.) as a macromonomer. As a release agent, 5 parts of dipentaerythritol hexamyristate was added thereto and mixed and dissolved, thereby obtaining a polymerizable monomer composition.

I-3-2. Production of an Aqueous Dispersion Medium

Separately, at room temperature, an aqueous solution of 6.2 parts of sodium hydroxide (alkali metal hydroxide) dissolved in 50 parts of ion-exchanged water, was gradually added with stirring to an aqueous solution of 10.2 parts of magnesium chloride (water-soluble polyvalent metal salt) dissolved in 250 parts of ion-exchanged water, thereby producing a magnesium hydroxide colloid (hardly water-soluble metal hydroxide colloid) dispersion liquid.

I-3-3. Droplet Formation Process

At room temperature, the polymerizable monomer composition was added to the magnesium hydroxide colloid dispersion liquid and stirred. Then, 6 parts of t-butylperoxy-2-ethylhexanoate (product name: PERBUTYL 0; manufactured by: NOF Corporation) was added thereto as a polymerization initiator. By means of an in-line type emulsifying and dispersing device (product name: EBARA MILDER; manufactured by: Ebara Corporation), the mixture was dispersed by high shear agitation at a rotational frequency of 15,000 rpm for ten minutes to form droplets of the polymerizable monomer composition.

I-3-4. Suspension Polymerization Process

The thus-obtained suspension liquid in which the droplets of the polymerizable monomer composition are dispersed (polymerizable monomer composition dispersion liquid) was poured into a reactor furnished with stirring vanes. The temperature of the liquid was increased to 90° C. to initiate a polymerization reaction. When the polymerization conversion rate reached almost 100%, the following were added thereto: 1 part of methyl methacrylate as a polymerizable monomer for shells and 0.3 part of 2,2'-azobis(2-methyl-N-(2-hydroxyethyl)-propionamide) (product name: VA-086; manufactured by: Wako Pure Chemical Industries, Ltd.; water-soluble) dissolved in 10 parts of ion-exchanged water, which is a polymerization initiator for shells. After keeping the reaction at 90° C. for four hours, the resultant was cooled with water to stop the reaction, thus obtaining an aqueous dispersion of colored resin particles having a core-shell type structure.

I-3-5. Post-Treatment Process

Sulfuric acid was added dropwise to the aqueous dispersion of colored resin particles at room temperature, with stirring the aqueous dispersion. The resultant was acid washed until the pH becomes 6.5 or less. Filtration separation was performed thereon, and 500 parts of ion-exchanged water was added to the thus-obtained solid to re-slurry the solid. A water washing treatment (washing/filtration/dehydration) was performed several times on the slurry. Then, filtration separation was performed thereon, and the thus-obtained solid was put in the container of a drying device and dried at 45° C. for 48 hours, thus obtaining dried colored resin particles.

Measurement of the volume average particle diameter (Dv) of the thus-obtained colored resin particles and calculation of the particle size distribution (Dv/Dn) of the same, were conducted.

About 0.1 g of the measurement sample (colored resin particles) was put in a beaker, and 0.1 mL of an aqueous solution of alkylbenzene sulfonic acid (product name: DRIWEL; manufactured by: Fujifilm Corporation) was added thereto as a dispersant. In addition, 10 to 30 mL of Isoton II was added thereto, followed by dispersion for three minutes with a 20 W ultrasonic disperser. By means of a particle diameter measuring device (product name: Multisizer; manufactured by: Beckman Coulter, Inc.), in the condition that the aperture diameter is 100 µm and the number of measured particles is 100,000, the volume average particle diameter (Dv) and number average particle diameter (Dn) of the colored resin particles were measured to calculate the particle size distribution (Dv/Dn) of the same. As a result, the volume average particle diameter (Dv) of the thus-obtained colored resin particles was found to be 9.7 μm, and the particle size distribution (Dv/Dn) of the same was found to be 1.14.

The average circularity of the thus-obtained colored resin particles was calculated.

First, 10 mL of ion-exchanged water was put in a container in advance, and 0.2 mL of an aqueous solution of alkylbenzene sulfonic acid (product name: DRIWEL; manufactured by: Fujifilm Corporation) was added thereto as a dispersant. In addition, 0.2 g of the colored resin particles was added thereto, followed by dispersion for three minutes with a 60 W (Watt) ultrasonic disperser. The colored resin particle concentration upon measurement was controlled to be 3,000 to 10,000 particles/μL, and of the colored resin particles, 1,000 to 10,000 colored resin particles having an equivalent circle diameter of 0.4 μm or more, were measured with a flow particle image analyzer (product name: FPIA-2100; manufactured by: Sysmex Corporation). As a result of calculating the average circularity from the thus-obtained measured values, the average circularity of the obtained colored resin particles was found to be 0.987.

I-4. Production of Toners for Developing Electrostatic Images

Toners for developing electrostatic images were produced by means of the core-shell type complex fine particles, etc., explained under "I-1. Production of core-shell type complex fine particles" and the colored resin particles explained under "I-3. Production and property evaluation of colored resin particles."

Example I-1

Here, 1.2 parts of the core-shell type complex fine particles I-A produced in the production example I-1 and 0.8 part of hydrophobized silica fine particles having a number average primary particle diameter of 22 nm (product name: TG-7120; manufactured by: Cabot Corporation) were added to 100 parts of the colored resin particles and mixed by stirring with an FM mixer (product name: FM-10; manufactured by Nippon Coke & Engineering Co., Ltd.) at a peripheral speed of 40 m/s for five minutes to cover the colored resin particles with the complex fine particles and silica fine particles, thus obtaining the toner for developing electrostatic images of Example I-1.

Example I-2

The toner for developing electrostatic images of Example I-2 was obtained in the same manner as Example I-1, except that the core-shell type complex fine particles I-A produced in the production example I-1 was changed to the core-shell type complex fine particles I-B produced in the production example I-2.

Example I-3

The toner for developing electrostatic images of Example I-3 was obtained in the same manner as Example I-1, except that the core-shell type complex fine particles I-A produced in the production example I-1 was changed to the core-shell type complex fine particles I-C produced in the production example I-3.

Example I-4

The toner for developing electrostatic images of Example I-4 was obtained in the same manner as Example I-1, except that the core-shell type complex fine particles I-A produced in the production example I-1 was changed to the core-shell type complex fine particles I-D produced in the production example I-4.

Example I-5

The toner for developing electrostatic images of Example I-5 was obtained in the same manner as Example I-1, except that the core-shell type complex fine particles I-A produced in the production example I-1 was changed to the core-shell type complex fine particles I-E produced in the production example I-5.

Comparative Example I-1

The toner for developing electrostatic images of Comparative Example I-1 was obtained in the same manner as Example I-1, except that the core-shell type complex fine particles I-A produced in the production example I-1 was changed to the silica fine particles I-A.

Comparative Example I-2

The toner for developing electrostatic images of Comparative Example I-2 was obtained in the same manner as Example I-1, except that the core-shell type complex fine particles I-A produced in the production example I-1 was changed to the silica fine particles I-B.

Comparative Example I-3

The toner for developing electrostatic images of Comparative Example I-3 was obtained in the same manner as Example I-1, except that the core-shell type complex fine particles I-A produced in the production example I-1 was changed to the core-shell type complex fine particles I-F produced in the production example I-6.

Comparative Example I-4

The toner for developing electrostatic images of Comparative Example I-4 was obtained in the same manner as Example I-1, except that the core-shell type complex fine particles I-A produced in the production example I-1 was changed to the core-shell type complex fine particles I-G produced in the production example I-7. I-5. Evaluation of the toners for developing electrostatic images For the toners for developing electrostatic images of Examples I-1 to I-5 and Comparative Examples I-1 to I-4, the following were conducted: evaluation of flowability; measurement of toner charge amount in the environment of normal temperature and normal humidity (N/N) or high temperature and high humidity (H/H); evaluation of fog in the environment of normal temperature and normal humidity (N/N) or high temperature and high humidity (H/H); and printing durability test.

I-5-1. Evaluation of Flowability

Three kinds of sieves were taken, the first one having aperture size of 150 μm, the second one having aperture size of 75 μm, and the third one having aperture size of 45 μm. They were stacked in this order, that is, in descending order of the aperture size. Thereafter, 4 g of the toner for developing electrostatic images to be measured, was taken and placed on the top sieve having the aperture size of 150 μm. Then, by means of a powder measuring device (product name: Powder Tester; manufactured by: Hosokawa Micron Corporation), the three kinds of stacked sieves were vibrated for 15 seconds in the condition that the vibration intensity scale is set to 4. Thereafter, the mass of the toner for developing electrostatic images remaining on each sieve was measured. The thus-measured values were substituted into the following formulae (I-1) to (I-3) each to obtain values a, b and c. The values a, b and c were substituted into the formula (I-4) to calculate flowability. Flowability was measured three times per sample to obtain the average.

$a=[($Mass of toner remaining on 150 μm sieve (g)$)/4$ g$]\times 100$   Formula (I-1)

$b=[($Mass of toner remaining on 75 μm sieve (g)$)/4$ g$]\times 100\times 0.6$   Formula (I-2)

$c=[($Mass of toner remaining on 45 μm sieve (g)$)/4$ g$]\times 100\times 0.2$   Formula (I-3)

Flowability$=100-(a+b+c)$   Formula (I-4)

I-5-2. Measurement of Toner Charge Amount in the Environment of Normal Temperature and Normal Humidity (N/N)

A commercially-available, non-magnetic, one-component developing printer (HL-3040CN) was used. After the toner cartridge of the printer was filled with the toner, a solid pattern with an image density of 0% was printed on a sheet. Toner left on a developing roller was collected with an electrometer (product name: TR8652; manufactured by: Advantest Corporation) in the environment of normal temperature and normal humidity (N/N) (temperature 23° C., humidity 50%) to measure the charge amount of the toner left on the developing roller. The charge amount of the toners of Examples and Comparative Examples (toner charge amount) was calculated by dividing the measured charge amount of the toner left on the developing roller by the weight of the collected toner.

(Measured charge amount (μC)/Weight of collected toner (g))=Toner charge amount (μC/g)

I-5-3. Measurement of Toner Charge Amount in the Environment of High Temperature and High Humidity (H/H)

The toner charge amount was measured in the same manner as "I-5-2. Measurement of toner charge amount in the environment of normal temperature and normal humidity (N/N)," except that after the toner cartridge of the printer was filled with the toner, the printer was allowed to stand in the environment of high temperature and high humidity (H/H) (temperature 35° C., humidity 80%) for 24 hours, and then the charge amount of the toner was measured in the same environment.

I-5-4. Evaluation of Fog in the Environment of Normal Temperature and Normal Humidity (N/N)

A commercially-available, non-magnetic, one-component developing printer (HL-3040CN) was used. After the toner cartridge of the printer was filled with the toner, the printer was allowed to stand in the environment of normal temperature and normal humidity (N/N) (temperature 23° C., humidity 50%) for 24 hours. Then, a solid pattern with an image density of 0% was printed on a sheet to visually confirm if there is no fog on the sheet. Thereafter, the whiteness degree of the printed surface of the sheet was measured with a whiteness colorimeter (manufactured by Nippon Denshoku Industries Co., Ltd.)

Fog density was calculated as follows:

{(Whiteness degree before printing)−(Whiteness degree of printed surface)}=Fog density I-5-5. Evaluation of Fog in the Environment of High Temperature and High Humidity (H/H)

After the toner cartridge of the printer was filled with the toner, the printer was allowed to stand in the environment of high temperature and high humidity (H/H) (temperature 35° C., humidity 80%) for 24 hours. Then, the fog density was calculated in the same manner as "I-5-4. Evaluation of fog in the environment of normal temperature and normal humidity (N/N)," except that fog was measured in the H/H environment.

I-5-6. Printing Durability Test

In the printing durability test, a commercially-available non-magnetic, one-component developing printer (HL-3040CN) was used. After the toner cartridge of the printer was filled with the toner, printing sheets were set in the printer. After the printer was allowed to stand in the environment of normal temperature and normal humidity (N/N) (temperature 23° C., humidity 50%) for 24 hours, 10,000 sheets were continuously printed at an image density of 5%.

Solid pattern printing with an image density of 100% was conducted every 500 sheets to measure the image density of the printed pattern with an image densitometer (product name: RD918; manufactured by: Macbeth Process Measurements Co.) Then, in addition, solid pattern printing with an image density of 0% was conducted and stopped in the middle of the printing. A piece of an adhesive tape (product name: Scotch mending tape 810-3-18; manufactured by: Sumitomo 3M Limited) was attached to the toner which was allowed to stand in a non-printed area on the photoconductor of the printer after development. Then, the piece was removed and attached to a printing sheet. Next, the whiteness degree (B) of the sheet to which the piece was attached, was measured with a whiteness colorimeter (product name: ND-1; manufactured by: Nippon Denshoku Industries Co., Ltd.) In the same manner, an unused piece of the adhesive tape was attached to the printing sheet, and the whiteness degree (A) of the printing sheet was measured. The difference between the whiteness degrees, (B-A), was defined as fog value (%). The smaller the fog value, the less fog and the better whiteness degree.

The number of continuously printed sheets which could maintain an image density of 1.30 or more and a fog value of 3% or less, was examined.

In Table I-2, "10000<" means that the toner could maintain the image quality of an image density of 1.30 or more and a fog value of 3% or less, even at the time of printing the 10,000th sheet.

Table I-2 shows measurement and evaluation results of the toners for developing electrostatic images of Examples I-1 to I-5 and Comparative Examples I-1 to I-4, in conjunction with the composition of the toners.

it is clear that the fog produced by the toner of Comparative Example I-1 is more than three times larger than the toners of Examples I-1 to I-5.

From these results, it is clear that the toner of Comparative Example I-1 comprising silica fine particles I-A, which is conventional silica fine particles, has poor flowability and

TABLE 2

Table I-2

|  |  | Example I-1 | Example I-2 | Example I-3 | Example I-4 | Example I-5 | Comparative Example I-1 | Comparative Example I-2 | Comparative Example I-3 | Comparative Example I-4 |
|---|---|---|---|---|---|---|---|---|---|---|
| External additive (I-A) |  | Complex fine particles I-A | Complex fine particles I-B | Complex fine particles I-C | Complex fine particles I-D | Complex fine particles I-E | Silica fine particles I-A | Silica fine particles I-B | Complex fine particles I-F | Complex fine particles I-G |
| Structural data of external additive (I-A) | Number average particle diameter of resin fine particles to be cores (nm) | 80 | 50 | 80 | 150 | 80 | — | — | 400 | 250 |
|  | Number average particle diameter of external additive (I-A) (nm) | 105 | 65 | 120 | 200 | 105 | 40 | 70 | 480 | 260 |
|  | Volume ratio of silica component of external additive (I-A) (% by volume) | 56 | 54 | 70 | 58 | 56 | 100 | 100 | 42 | 11 |
|  | Polymerizable monomer — Content of monovinyl monomer (parts) | 95 | 95 | 95 | 95 | 100 | — | — | 100 | 100 |
|  | Content of cross-linkable polymerizable monomer (parts) | 5 | 5 | 5 | 5 | 0 | — | — | 0 | 0 |
| Added amount of external additive (I-A) (parts) |  | 1.2 | 1.2 | 1.2 | 1.2 | 1.2 | 1.2 | 1.2 | 1.2 | 1.2 |
| Charge property of colored resin particles |  | Positively charged | Positively charged | Positively charged | Positively charged | Positively charged | Positively charged | Positively charged | Positively charged | Positively charged |
| Toner properties | Flowability | 97 | 86 | 86 | 88 | 97 | 80 | 94 | 69 | 78 |
|  | Charge amount in NN environment (μC/g) | 38 | 35 | 42 | 25 | 36 | 37 | 18 | 30 | 20 |
|  | Charge amount in HH environment (μC/g) | 29 | 31 | 36 | 21 | 27 | 25 | 14 | 20 | 15 |
| Results of printing test | NN fog | 0.2 | 0.2 | 0.2 | 0.8 | 0.8 | 0.2 | 0.8 | 2.8 | 3.0 |
|  | HH fog | 0.6 | 1.9 | 2 | 2.5 | 1.1 | 8 | 12 | 25 | 22 |
|  | Printing durability (sheets) | 10000< | 9000 | 10000< | 10000< | 7000 | 10000< | 10000< | 7000 | 6000 |

I-6. Evaluation Results of the Toners

The toner of Comparative Example I-1 is evaluated now. The toner of Comparative Example I-1 showed a toner charge amount of 37 μC/g in the environment of normal temperature and normal humidity (N/N) and a toner charge amount of 25 μC/g in the environment of high temperature and high humidity (H/H), both of which are moderate charge amounts. Also, the toner of Comparative Example I-1 resulted in that the fog density was 0.2 in the environment of normal temperature and normal humidity (N/N) and the number of printed sheets on which no fog appeared, was more than 10,000 in the environment of normal temperature and normal humidity (N/N). Therefore, the toner showed no problem with printing durability in at least the environment of normal temperature and normal humidity (N/N).

However, the flowability of the toner of Comparative Example I-1 is 80 and the toner showed a slightly inferior result in flowability. Also, the toner of Comparative Example I-1 showed a fog density of 8 in the environment of high temperature and high humidity (H/H), and compared to the results of Examples I-1 to I-5, which will be explained below, poor printing durability in the environment of high temperature and high humidity (H/H).

Next, the toner of Comparative Example I-2 is evaluated. The toner of Comparative Example I-2 showed a flowability of 94 and had no problem with flowability. Also, the toner of Comparative Example I-2 resulted in that the fog density was 0.8 in the normal temperature and normal humidity (N/N) and the number of printed sheets on which fog appeared, was more than 10,000 in the environment of normal temperature and normal humidity (N/N). Therefore, the toner showed no problem with printing durability in at least the environment of normal temperature and normal humidity (N/N).

However, the toner of Comparative Example I-2 showed a toner charge amount of 18 μC/g in the environment of normal temperature and normal humidity (N/N) and a toner charge amount of 14 μC/g in the environment of high temperature and high humidity (H/H). Therefore, among the toners of Example I-1 to I-5 and Comparative Examples I-1 to I-4, the toner of Comparative Example I-2 showed the lowest charge amount. Also, the toner of Comparative Example I-2 showed a fog density of 12 in the environment of high temperature and high humidity (H/H) and compared to the results of Examples I-1 to I-5, which will be explained below, it is clear that the fog produced by the toner of Comparative Example I-2 is more than 5 times larger than the toners of Examples I-1 to I-5.

From these results, it is clear that the toner of Comparative Example I-2 comprising silica fine particles I-B, which is conventional silica fine particles, has low charge amount in the environment of normal temperature and normal humidity (N/N) and also in the environment of high temperature and high humidity (H/H); moreover, it has poor printing durability in the environment of high temperature and high humidity (H/H).

Next, the toner of Comparative Example I-3 is evaluated. The toner of Comparative Example I-3 showed a toner charge amount of 30 µC/g in the environment of normal temperature and normal humidity (N/N) and a toner charge amount of 20 µC/g in the environment of high temperature and high humidity (H/H), both of which are moderate charge amounts.

However, the toner of Comparative Example I-3 showed a flowability of 69, which is the worst flowability among the toners of Examples I-1 to I-5 and Comparative Examples I-1 to I-4. Also, the toner of Comparative Example I-3 showed a fog density of 2.8 in the environment of normal temperature and normal humidity (N/N), and compared to the results of Examples I-1 to I-5, which will be explained below, it is clear that the fog produced by the toner of Comparative Example I-3 in the environment of normal temperature and normal humidity (N/N) is more than four times larger than the toners of Examples I-1 to I-5. In addition, the toner of Comparative Example I-3 showed a fog density of 25 in the environment of high temperature and high humidity (H/H), and compared to the results of Examples I-1 to I-5, it is clear that the fog produced by the toner of Comparative Example I-3 in the environment of high temperature and high humidity (H/H) is more than 10 times larger than the toners of Examples I-1 to I-5.

From these results, it is clear that the toner of Comparative Example I-3, which comprises core-shell type complex fine particles in which the volume ratio of the silica component is lower than the complex fine particles used in the present invention, has poor flowability and poor printing durability in the environment of normal temperature and normal humidity (N/N) and also in the environment of high temperature and high humidity (H/H).

Next, the toner of Comparative Example I-4 is evaluated. The toner of Comparative Example I-4 showed a flowability of 78 and a slightly inferior result in flowability. The toner of Comparative Example I-4 showed a toner charge amount of 20 µC/g in the normal temperature and normal humidity (N/N) and a toner charge amount of 15 µC/g in the high temperature and high humidity. Compared to the toners of Examples I-1 to I-5, which will be explained below, the toner of Comparative Example I-4 showed low charge amounts. Also, the toner of Comparative Example I-4 showed a fog density of 3.0 in the environment of normal temperature and normal humidity (N/N), and compared to the results of Examples I-1 to I-5, which will be explained below, it is clear that the fog produced by the toner of Comparative Example I-4 in the environment of normal temperature and normal humidity (N/N) is 4 times larger than the toners of Examples I-1 to I-5. In addition, the toner of Comparative Example I-4 showed a fog density of 22 in the environment of high temperature and high humidity (H/H), and compared to the results of Examples I-1 to I-5, which will be explained below, it is clear that the fog produced by the toner of Comparative Example I-4 in the environment of high temperature and high humidity (H/H) is 9 times larger than the toners of Examples I-1 to I-5.

From these results, it is clear that the toner of Comparative Example I-4, which comprises core-shell type complex fine particles in which the volume ratio of the silica component is extremely lower than the complex fine particles used in the present invention, has a low charge amount in the environment of normal temperature and normal humidity (N/N) and also in the environment of high temperature and high humidity (H/H); moreover, it has poor flowability and poor printing durability in the environment of normal temperature and normal humidity (N/N) and also in the environment of high temperature and high humidity (H/H).

Compared to Comparative Examples I-1 to I-4, the toners of Examples I-1 to I-5 resulted in the following: the flowability is 86 or more; the toner charge amount is 25 µC/g or more in the environment of normal temperature and normal humidity (N/N); the toner charge amount is 21 µC/g or more in the environment of high temperature and high humidity (H/H); the fog density is 0.8 or less in the environment of normal temperature and normal humidity (N/N); the fog density is 2.5 or less in the environment of high temperature and high humidity (H/H); and the number of printed sheets on which no fog appeared, is 7,000 or more in the environment of normal temperature and normal humidity (N/N). Therefore, it is clear that the toners of Examples I-1 to I-5, each of which comprises as an external additive the core-shell type complex fine particles in which the resin fine particles are covered with silica and the volume ratio of the silica component of the complex fine particles is 45 to 75% by volume when the total volume of the complex fine particles is 100% by volume, have excellent flowability and charge property, and they are unlikely to cause a deterioration in image quality by fog, etc., even in the case of continuous printing of a large number of sheets.

Example Series II

II-1. Production of Core-Shell Type Complex Fine Particles

Production Example II-1

In a container being furnished with a stirrer and having the inside air replaced by nitrogen, 3 parts of soft type dodecylbenzenesulfonic acid was dissolved in 150 parts of ion-exchanged water. Then, 95 parts of styrene was emulsified therein to produce an emulsion of polymerizable monomer. After increasing the emulsion temperature to 80° C., 0.6 part of potassium persulfate dissolved in 10 parts of ion-exchanged water, was added thereto and polymerized for two hours. Then, after decreasing the temperature of the reactor to 40° C., 5 parts of divinylbenzene was added thereto and stirred for two hours. Thereafter, the temperature of the mixture was increased to 85° C., and 0.1 part of potassium persulfate dissolved in 2 parts of water, was added thereto to carry out a polymerization reaction for four hours. A hydroquinone aqueous solution, which is a stop agent, was added thereto to complete the polymerization. The polymerization conversion rate was 99% at this time. Water-soluble substances were removed therefrom by ultrafiltration. The pH and concentration of the resultant was controlled to obtain an emulsion of resin fine particles having a solid content concentration of 50% and a pH of 8.5. A part of the emulsion was dried and used for the below-described measurement of the number average particle diameter of the resin fine particles. The number average particle diameter of the resin fine particles was 80 nm.

After 200 parts of the thus-obtained emulsion (solid content equivalent: 100 parts) was added to 10,000 parts of methanol, 750 parts of tetraethoxytitanium, which is a titanium compound, was dissolved therein. In this state, the mixture was heated to 50° C. and stirred for one hour to disperse the resin fine particles in the medium in which titanium alkoxide is dissolved. Then, 20 parts of a 28% by mass $NH_4OH$ aqueous solution was added dropwise to the solution and stirred at room temperature for 48 hours to carry out a sol-gel reaction, thus covering the surface of the resin fine particles with titania.

After the reaction was completed, the thus-obtained particles were washed with ion-exchanged water and then with methanol, followed by filtration separation and drying at 45° C. for 24 hours under a reduced pressure of 40 kPa, thereby obtaining core-shell type complex fine particles II-1 in which the resin fine particles are covered with titania. Part of the core-shell type complex fine particles II-1 was used for the below-described measurement of the number average particle diameter of the core-shell type complex fine particles.

Then, 100 g of the core-shell type complex fine particles II-1 was dispersed in 600 g of toluene. After 3-aminopropyltriethoxysilane (a silane compound containing an amino group) was added thereto at a ratio of 1 part (3-aminopropyltriethoxysilane) to 100 parts (the fine particles II-1), the mixture was mixed and dispersed for 15 minutes to bring 3-aminopropyltriethoxysilane into contact with the fine particles. Next, after 1 part of hexamethyldisilazane (a silane compound containing no amino group) was added to the fine particles, the mixture was mixed and dispersed for 15 minutes to bring hexamethyldisilazane into contact with the fine particles. After the resulting dispersion liquid was distilled under reduced pressure and dried, the fine particles were pulverized to obtain positively-charged, hydrophobized core-shell type complex fine particles II-A. The hydrophobizing treatment made no change to the particle diameter of the fine particles.

Production Example II-2

Core-shell type complex fine particles II-B was produced in the same manner as the production example II-1, except the following: an emulsion of resin fine particles having a number average particle diameter of 50 nm was obtained as a result of changing the added amount of the soft type dodecylbenzenesulfonic acid from 3 to 8 parts and polymerization, and upon the production of core-shell type complex fine particles, the added amount of tetraethoxytitanium was changed from 750 to 900 parts.

Production Example II-3

Core-shell type complex fine particles II-C was produced in the same manner as the production example II-1, except that the time of sol-gel reaction was changed from 48 to 72 hours.

Production Example II-4

Core-shell type complex fine particles II-D was produced in the same manner as the production example II-1, except that the polymerizable monomer used in the first polymerization was changed from 95 parts of styrene and 5 parts of divinylbenzene to 100 parts of styrene, and 5 parts of divinylbenzene, which was added later in the production example II-1, was not used.

Production Example II-5

Core-shell type complex fine particles II-E was produced in the same manner as the production example II-1, except that 750 parts of tetraethoxytitanium was changed to 750 parts of triethoxyaluminum upon the production of core-shell type complex fine particles.

Production Example II-6

Core-shell type complex fine particles II-F was produced in the same manner as the production example II-1, except that an emulsion of resin fine particles having a number average particle diameter of 150 nm was obtained as a result of changing the added amount of the soft type dodecylbenzenesulfonic acid from 3 to 0.8 part and polymerization, and upon the production of core-shell type complex fine particles, 750 parts of tetraethoxytitanium was changed to 620 parts of triethoxyaluminum.

II-2. Evaluation of the Properties of the Complex Fine Particles, Etc

The core-shell type complex fine particles II-A to II-F obtained in the production examples II-1 to II-6 were each measured for number average particle diameter and moisture absorption amount. For each of the core-shell type complex fine particles II-A to II-F, the number average particle diameter of the resin fine particles, which is a raw material of the complex fine particles II-A to II-F, was measured to calculate the ratio of the inorganic component of the core-shell type complex fine particles.

II-2-1. Measurement of the Number Average Particle Diameter of the Core-Shell Type Complex Fine Particles and that of the Resin Fine Particles, which is a Raw Material The number average particle diameter of the core-shell type complex fine particles and that of the resin fine particles, which is a raw material, were measured by the following method. In particular, the complex fine particles and the resin fine particles were observed with a field emission scanning electron microscope (product name: S-4500; manufactured by: Hitachi, Ltd.) The particle diameter was measured so that the cumulative number of measured fine particles of each type reaches 300 or more, thus calculating the number average particle diameter.

II-2-2. Calculation of the Ratio of the Inorganic Component of the Core-Shell Type Complex Fine Particles For each of the core-shell type complex fine particles II-A to II-F, the ratio of the volume of the covered inorganic component to the volume of the whole core-shell type complex fine particles, was calculated by the following formula.

$$[\text{Inorganic component ratio}] = [\{(4/3)\pi(r_2/2)^3 - (4/3)\pi(r_1/2)^3\}/\{(4/3)\pi(r_2/2)^3\}] \times 100 = \{(r_2^3 - r_1^3)/(r_2^3)\} \times 100$$

In this formula, $r_1$ is the number average particle diameter of the resin fine particles to be cores, and $r_2$ is the number average particle diameter of the core-shell type complex fine particles.

II-2-3. Measurement of the Moisture Absorption Amount of the Core-Shell Type Complex Fine Particles A moisture sorption-desorption analyzer (product name: IGAsorp; manufactured by: Hiden Isochema) was used for the measurement of moisture absorption amount. Inside the analyzer, a sample was allowed to stand under a dry nitrogen flow for one hour. Thereafter, moisture was adsorbed onto the sample in the air at a temperature of 32° C. and at a humidity of 80% for an hour to measure the mass of the moisture-absorbing sample. From the measurement results, the moisture absorption amount (% by mass) was defined as (increased mass/sample mass)×100.

For the core-shell type complex fine particles II-A to II-F, measurement results of moisture absorption amount are shown in Table II-1, in conjunction with structural data of the particles.

TABLE 3

Table II-1

|  |  | Complex fine particles II-A | Complex fine particles II-B | Complex fine particles II-C | Complex fine particles II-D | Complex fine particles II-E | Complex fine particles II-F |
|---|---|---|---|---|---|---|---|
| Number average particle diameter of resin fine particles to be cores (nm) | | 80 | 50 | 80 | 80 | 80 | 150 |
| Number average particle diameter of complex fine particles (nm) | | 105 | 65 | 120 | 105 | 105 | 200 |
| Volume ratio of inorganic component of complex fine particles (% by volume) | | 56 | 54 | 70 | 56 | 56 | 58 |
| Polymerizable monomer | Content of monovinyl monomer (parts) | 95 | 95 | 95 | 100 | 95 | 95 |
|  | Content of cross-linkable polymerizable monomer (parts) | 5 | 5 | 5 | 0 | 5 | 5 |
| Moisture absorption amount (%) | | 1.4 | 1.0 | 0.8 | 1.4 | 1.4 | 1.4 |

II-3. Production and Property Evaluation of Colored Resin Particles colored resin particles were produced by the same method as the method explained under I-3 of Example Series I.

For the thus-obtained colored resin particles, measurement of the volume average particle diameter (Dv), calculation of the particle size distribution (Dv/Dn) and calculation of the average circularity were carried out by the same methods as those explained under I-3 of Example Series I. As a result, the volume average particle diameter (Dv) of the thus-obtained colored resin particles was found to be 9.7 μm, the particle size distribution (Dv/Dn) of the same was found to be 1.14, and the average circularity of the same was found to be 0.987.

II-4. Production of Toners for Developing Electrostatic Images

Toners for developing electrostatic images were produced by means of the core-shell type complex fine particles explained under "II-1. Production of core-shell type complex fine particles" and the colored resin particles explained under "II-3. Production and property evaluation of colored resin particles."

Example II-1

Here, 0.5 part of the core-shell type complex fine particles II-A produced in the production example II-1, 0.8 part of TG-7120 (manufactured by: Cabot Corporation) and 1.0 part of NA50Y (manufactured by: Nippon Aerosil Co., Ltd.) were added to 100 parts of the colored resin particles and mixed by stirring with an FM mixer (product name: FM-10; manufactured by Nippon Coke & Engineering Co., Ltd.) to cover the colored resin particles with the complex fine particles and silica fine particles, thus obtaining the toner for developing electrostatic images of Example II-1. At this time, the peripheral speed of the stirring vanes was 40 m/s and the stirring time was five minutes.

Example II-2

The toner for developing electrostatic images of Example II-2 was obtained in the same manner as Example II-1, except that the core-shell type complex fine particles II-A produced in the production example II-1 was changed to the core-shell type complex fine particles II-B produced in the production example II-2.

Example II-3

The toner for developing electrostatic images of Example II-3 was obtained in the same manner as Example II-1, except that the core-shell type complex fine particles II-A produced in the production example II-1 was changed to the core-shell type complex fine particles II-C produced in the production example II-3.

Example II-4

The toner for developing electrostatic images of Example II-4 was obtained in the same manner as Example II-1, except that the core-shell type complex fine particles II-A produced in the production example II-1 was changed to the core-shell type complex fine particles II-D produced in the production example II-4.

Example II-5

The toner for developing electrostatic images of Example II-5 was obtained in the same manner as Example II-1, except that the core-shell type complex fine particles II-A produced in the production example II-1 was changed to the core-shell type complex fine particles II-E produced in the production example II-5.

Example II-6

The toner for developing electrostatic images of Example II-6 was obtained in the same manner as Example II-1, except that the core-shell type complex fine particles II-A produced in the production example II-1 was changed to the core-shell type complex fine particles II-F produced in the production example II-6.

Comparative Example II-1

The toner for developing electrostatic images of Comparative Example II-1 was obtained in the same manner as Example II-1, except that the core-shell type complex fine particles II-A produced in the production example II-1 was not used.

II-5. Evaluation of the Toners for Developing Electrostatic Images

For the toners for developing electrostatic images of Examples II-1 to II-6 and Comparative Example II-1, the following were conducted: evaluation of fog in the environment of normal temperature and normal humidity (N/N) or high temperature and high humidity (H/H); evaluation of thin line reproducibility in the environment of low temperature and low humidity (L/L); and printing durability test in the environment of normal temperature and normal humidity (N/N).

II-5-1. Evaluation of Fog in the Environment of Normal Temperature and Normal Humidity (N/N)

In this evaluation, a commercially-available, non-magnetic, one-component developing printer (HL-3040CN) was used. After the toner cartridge of the printer was filled with the toner, the printer was allowed to stand in the environment of normal temperature and normal humidity (N/N) (temperature 23° C., humidity 50%) for 24 hours. Then, in the same environment, a solid pattern with an image density of 0% was printed on a sheet. The whiteness degree of the printed surface of the sheet was measured with a whiteness colorimeter (manufactured by Nippon Denshoku Industries Co., Ltd.) Fog density was obtained by the following formula:

(Whiteness degree before printing)−(Whiteness degree of printed surface)=Fog density II-5-2. Evaluation of Fog in the Environment of High Temperature and High Humidity (H/H)

After the toner cartridge of the printer was filled with the toner, the printer was allowed to stand in the environment of high temperature and high humidity (H/H) (temperature 35° C., humidity 80%) for 24 hours. Then, the fog density was calculated in the same manner as "II-5-1. Evaluation of fog in the environment of normal temperature and normal humidity (N/N)," except that fog was measured in the H/H environment.

II-5-3. Evaluation of Thin Line Reproducibility

The toner was allowed to stand in the environment of low temperature and low humidity (L/L) (temperature 10° C., humidity 20% RH) for one day. By means of the toner and the printer used in the above evaluation of fog (HL-3040CN), a line was printed continuously on up to 10,000 sheets, which is a 2×2 dot-line (line width: about 85 μm).

Every 500 prints, the concentration distribution data of the line image was measured and collected with a printing evaluation system (product name: RT2000; manufactured by: YAMA Inc.)

As the evaluation criteria, the line width of a thin line image printed in the environment of normal temperature and normal humidity (N/N) (temperature 23° C., humidity 50%) was used. The evaluation method is as follows: the full width of the line printed at half the maximum concentration of the toner in the environment of low temperature and low humidity (L/L), is defined as line width; when the difference between the line width and the above-defined one as the evaluation criteria is 10 μm or less, the toner is considered to be able to reproduce the line image printed on the first sheet and considered as "⊚"; the toner which can keep the difference in the range of 10 μm or more and 20 μm or less, is evaluated as "○"; and when the difference is more than 20 μm, the toner is considered as "x".

II-5-4. Printing Durability Test in the Environment of Normal Temperature and Normal Humidity (N/N)

In the printing durability test, a commercially-available non-magnetic, one-component developing printer (HL-3040CN) was used. After the toner cartridge of the printer was filled with the toner, printing sheets were set in the printer.

After the printer was allowed to stand in the environment of normal temperature and normal humidity (N/N) (temperature 23° C., humidity 50%) for 24 hours, 10,000 sheets were continuously printed at an image density of 5%. Solid pattern printing with an image density of 100% was conducted every 500 sheets to measure the image density of the printed pattern with an image densitometer (product name: RD918; manufactured by: Macbeth Process Measurements Co.) Then, in addition, solid pattern printing with an image density of 0% was conducted and stopped in the middle of the printing. A piece of an adhesive tape (product name: Scotch mending tape 810-3-18; manufactured by: Sumitomo 3M Limited) was attached to the toner which was allowed to stand in a non-printed area on the photoconductor of the printer after development. Then, the piece was removed and attached to a printing sheet. Next, the whiteness degree (B) of the sheet to which the piece was attached, was measured with a whiteness colorimeter (product name: ND-1; manufactured by: Nippon Denshoku Industries Co., Ltd.) In the same manner, an unused piece of the adhesive tape was attached to the printing sheet, and the whiteness degree (A) of the printing sheet was measured. The difference between the whiteness degrees, (B-A), was defined as fog value (%). The smaller the fog value, the less fog and the better whiteness degree.

The number of continuously printed sheets which could maintain an image density of 1.30 or more and a fog value of 3% or less, was examined.

In Table II-2, "10000<" means that the toner could maintain the image quality of an image density of 1.30 or more and a fog value of 3% or less, even at the time of printing the 10,000th sheet.

Table II-2 shows measurement and evaluation results of the toners for developing electrostatic images of Examples II-1 to II-6 and Comparative Example II-1, in conjunction with the composition of the toners.

TABLE 4

Table II-2

|  |  | Example II-1 | Example II-2 | Example II-3 | Example II-4 | Example II-5 | Example II-6 | Comparative Example II-1 |
|---|---|---|---|---|---|---|---|---|
| Complex fine particles | | Complex fine particles II-A | Complex fine particles II-B | Complex fine particles II-C | Complex fine particles II-D | Complex fine particles II-E | Complex fine particles II-F | — |
| Added amount of Complex fine particles (part) | | 0.5 | 0.5 | 0.5 | 0.5 | 0.5 | 0.5 | — |
| Results of Printing test | NN fog density | 0.2 | 0.2 | 0.2 | 0.8 | 0.8 | 0.8 | 0.7 |
| | HH fog density | 1.5 | 2.2 | 1.4 | 2.0 | 2.6 | 1.4 | 3.2 |
| | LL thin line reproducibility | ◉ | ◉ | ○ | ○ | ○ | ○ | X |
| | Printing durability (sheets) | 10000< | 10000< | 10000< | 7000< | 10000< | 10000< | 10000< |

II-6. Evaluation Results of the Toners

The toner of Comparative Example II-1 is evaluated now. The toner of Comparative Example II-1 resulted in that the fog density was 0.7 in the environment of normal temperature and normal humidity (N/N) and the number of printed sheets on which no fog appeared, was more than 10,000 in the environment of normal temperature and normal humidity (N/N). Therefore, the toner showed no problem with printing durability in at least the environment of normal temperature and normal humidity (N/N).

However, the fog density of the toner of Comparative Example II-1 was 3.2 in the environment of high temperature and high humidity (H/H). This result is the highest fog density among the toners of Examples II-1 to II-6 and Comparative Example II-1. Also, only the toner of Comparative Example II-1 resulted in "x" in the evaluation of thin line reproducibility in the environment of low temperature and low humidity (L/L).

From these results, it is clear that the toner of Comparative Example II-1, which does not comprise as an external additive the core-shell type complex fine particles in which the resin particles are covered with at least one inorganic component, has poor printing durability in the environment of high temperature and high humidity (H/H) and poor thin line reproducibility in the environment of low temperature and low humidity (L/L).

Compared to Comparative Example II-1, the toners of Examples II-1 to II-6 resulted in following: the fog density was 0.8 or less in the environment of normal temperature and normal humidity (N/N); the fog density was 2.6 or less in the environment of high temperature and high humidity (H/H); the number of printed sheets on which no fog appeared was more than 7,000 in the environment of normal temperature and normal humidity (N/N); and the evaluation of thin line reproducibility was "○" or "◉" in the environment of low temperature and low humidity (L/L). Therefore, it is clear that the toners of Examples II-1 to II-6, each of which comprises as an external additive the core-shell type complex fine particles in which the resin particles are covered with at least one inorganic component, cause no deterioration in thin line reproducibility even in the environment of low temperature and low humidity and thus can perform stable printing; moreover, they cause no printing failure which is due to an increase in charge amount, and thus they can provide excellent image quality.

The invention claimed is:

1. A toner for developing electrostatic images, comprising an external additive and colored resin particles comprising a binder resin and a colorant,
    wherein the external additive is core-shell type complex fine particles in which resin fine particles are covered with at least one inorganic component selected from the group consisting of silica, alumina, titania and zirconia, and the volume ratio of the inorganic component of the core-shell type complex fine particles is 45 to 75% by volume when the total volume of the core-shell type complex fine particles is 100% by volume.

2. The toner for developing electrostatic images according to claim 1, wherein the core-shell type complex fine particles have a moisture absorption amount of 0.5 to 2.5% by mass.

3. The toner for developing electrostatic images according to claim 1, wherein the added amount of the core-shell type complex fine particles is 0.1 to 2.0 parts by mass with respect to 100 parts by mass of the colored resin particles.

4. The toner for developing electrostatic images according to claim 1, wherein the colored resin particles have a volume average particle diameter of 4 to 12 μm and an average circularity of 0.96 to 1.00.

5. The toner for developing electrostatic images according to claim 1, wherein the colored resin particles and the core-shell type complex fine particles are positively charged.

6. The toner for developing electrostatic images according to claim 1, wherein the core-shell type complex fine particles have a number average particle diameter of 30 to 300 nm.

7. The toner for developing electrostatic images according to claim 1, wherein the resin fine particles of the core-shell type complex fine particles are fine particles comprising a cross-linked resin.

* * * * *